US006983028B2

(12) United States Patent
Ahn

(10) Patent No.: US 6,983,028 B2
(45) Date of Patent: Jan. 3, 2006

(54) CARRIER RESTORATION APPARATUS AND METHOD

(75) Inventor: Keun Hee Ahn, Inchon-shi (KR)

(73) Assignee: LG Electronics Inc., Seoul (KR)

( * ) Notice: Subject to any disclaimer, the term of this patent is extended or adjusted under 35 U.S.C. 154(b) by 765 days.

(21) Appl. No.: 09/934,693

(22) Filed: Aug. 23, 2001

(65) Prior Publication Data

US 2002/0067778 A1 Jun. 6, 2002

(30) Foreign Application Priority Data

Aug. 23, 2000 (KR) ................ 2000-48926

(51) Int. Cl.
*H04L 27/38* (2006.01)
*H04B 1/10* (2006.01)

(52) U.S. Cl. .............. 375/326; 375/233; 375/350
(58) Field of Classification Search ......... 375/232, 375/229, 231, 233, 235, 344, 261, 39, 94, 375/14, 97, 106, 324, 327, 326, 341, 340, 375/348, 230, 216, 321, 329, 331; 455/226.3; 329/304, 307, 310, 306; 332/103; 371/46; 364/724.2; 331/4

See application file for complete search history.

(56) References Cited

U.S. PATENT DOCUMENTS

| | | | | |
|---|---|---|---|---|
| 5,311,546 A | * | 5/1994 | Paik et al. ............. | 375/232 |
| 5,363,408 A | * | 11/1994 | Paik et al. ............. | 375/261 |
| 5,471,508 A | * | 11/1995 | Koslov ................ | 375/344 |
| 5,519,356 A | * | 5/1996 | Greenberg ............. | 392/304 |
| 5,940,450 A | * | 8/1999 | Koslov et al. .......... | 375/344 |
| 6,081,563 A | * | 6/2000 | Taga et al. ............ | 375/344 |
| 6,115,433 A | * | 9/2000 | de Lantremange ....... | 375/232 |
| 6,650,715 B1 | * | 11/2003 | Kim et al. ............ | 375/344 |
| 6,678,317 B1 | * | 1/2004 | Murakami et al. ....... | 375/232 |
| 6,775,334 B1 | * | 8/2004 | Liu et al. ............ | 375/341 |
| 6,842,495 B1 | * | 1/2005 | Jaffe et al. ........... | 375/326 |

OTHER PUBLICATIONS

Adaptive blind equalization coupled with carrier recovery for HDTV modem□□Choi, Y.S.; Hwang, H.; Song, D.I.; □□Consumer Electronics, IEEE Transactions on , vol.: 39, Issue: 3, Aug. 1993 □□pp.: 386-391□□.*
New blind equalization techniques based on constant modulus algorithm□□Kil Nam Oh; Yong Ohk Chin; □□Global Telecommunications Conference, 1995. GLOBECOM '95., IEEE, vol.: 2, Nov. 13-17, 1995 □□pp.: 865-869 vol. 2□□.*

* cited by examiner

*Primary Examiner*—Jay K. Patel
*Assistant Examiner*—Jacob Meek
(74) *Attorney, Agent, or Firm*—Birch Stewart Kolasch & Birch LLP

(57) ABSTRACT

A carrier restoration apparatus for acquiring a frequency offset and tracking a phase jitter from a pass-band digital signal having the frequency offset and the phase jitter is disclosed. In the apparatus, a frequency acquisition PLL section for acquiring the frequency offset and a phase tracking PLL section for tracking the residual phase jitter are separately constructed, and the apparatus operates in two modes for first acquiring the frequency offset and then tracking the residual phase jitter. Thus, a rapid acquisition/tracking is performed so as to minimize the frequency offset and phase jitter of several hundred KHz produced from a tuner or an RF oscillator, and a high-reliability acquisition/tracking can be performed even under the low SNR and serious channel ISI (i.e., ghost).

16 Claims, 14 Drawing Sheets

Backgound Art

CARRIER RESTORATION APPARATUS AND METHOD

BACKGROUND OF THE INVENTION

1. Field of the Invention

The present invention relates generally to a quadrature amplitude modulation/phase shift keying (QAM/PSK) receiver, and more particularly, to a carrier restoration apparatus and method that compensates for a frequency offset and a phase jitter of a carrier.

2. Background of the Related Art

Typically, a quadrature amplitude modulation (QAM) is used for cable transmission/reception of compressed digital video data in a HDTV. Especially, the 256 QAM modulation is performed in a manner that the compressed video data is encoded for transmission to output 256 constellations corresponding to 8 bits per symbol period (i.e., 5.3607 MHz) as vector values, orthogonal projected values of the vector values on orthogonal axes I and Q are carrier-suppression-modulated by sine and cosine waves, respectively, and then the modulated waves are added together to be transmitted.

In order for a receiving end to obtain the vector values of the 256 constellations again by demodulation, it is required to restore the carrier that is phase-synchronized with the carrier of the received signal and has not been modulated. That is because the orthogonal projection values of the vector values of the 256 constellations on the orthogonal axes I and Q can be obtained by multiplying the received signal by the sine and cosine waves phase-synchronized with the carrier of the received signal, respectively.

Specifically, a carrier restoration section mounted on the QAM receiver in the HDTV cable transmission system should rapidly acquire and track a frequency offset $\Delta\omega$ of several hundred KHz and a residual phase jitter $\Delta\theta$ generated from a tuner or RF oscillator to minimize them. Also, the carrier restoration section should perform a high-reliability acquisition/tracking operation even under a low signal-to-noise ratio (SNR) and a severe channel ISI (i.e., ghost).

FIG. 1 is a block diagram illustrating the construction of a general television (TV) receiver. According to this TV receiver, a preprocessing section 11 outputs to a carrier restoration section 12 a pass-band digital signal having a frequency offset and phase jitter. The carrier restoration section 12 modulates the pass-band digital signal outputted from the preprocessing section 11 into sine/cosine waves to generate a base-band digital signal from which the frequency offset and the phase jitter are removed. The base-band digital signal is outputted to a post-processing section 13.

For example, if it is assumed that the carrier restoration section of FIG. 1 restores the carrier of the signal modulated by the QAM, the effect exerted by a phase error at that time is as follows.

That is, if it is defined that I(t) and Q(t) are inphase and quadrature base-band signals, and a modulated signal is fc, a QAM-modulated signal S(t) is expressed by the following equation 1.

$$S(t) = I(t)^* \cos(2\pi f_c t) - Q(t)^* \sin(2\pi f_c t) \quad \text{[Equation 1]}$$

If the modulated signal is then demodulated into two inphase and quadrature carrier waves having a phase error $\phi$, the base-band signals as shown in the following equations 2 and 3 are obtained.

$$DI(t) = LPF\{S(t) * \cos(2\pi f_c t + \phi)\} \quad \text{[Equation 2]}$$
$$= (1/2) * I(t) * \cos(\phi) - (1/2) * Q(t) * \sin(\phi)$$

$$DQ(t) = LPF\{S(t) * \sin(2\pi f_c t + \phi)\} \quad \text{[Equation 3]}$$
$$= (1/2) * I(t) * \sin(\phi) - (1/2) * Q(t) * \cos(\phi)$$

$\cos(\phi)$ of the first term of Equation 2 and of the second term of Equation 3 represents the gain error, and $\sin(\phi)$ of the second term of Equation 2 and of the third term of Equation 3 represents an error caused by interference.

As described above, in case of the QAM, the phase error of the restored carrier has an effect on not only the gain error but also the error due to the interference, and thus this causes its effect to become more serious.

Accordingly, two conventional method of restoring the carrier in the receiving end have been proposed to solve the above-described problem.

One of them is a method of extracting a pilot signal from the frequency of a received signal, and synchronizing an output frequency and phase of a local oscillator with those of the received signal in the receiving end. This method is used for restoring the carrier of a vestigial side band (VSB) that is the ground wave of the conventional HDTV transmission system.

The other is a method of estimating the frequency and phase of the carrier directly from a suppression-modulated signal. This method has been widely used for the carrier restoration of the QAM and PSK of the conventional HDTV cable transmission system.

As the conventional carrier restoration method for estimating the frequency and phase of the carrier directly from the suppression-modulated signal, there have been proposed a square loop method as shown in FIG. 2, Costas loop method in FIG. 3, and decision feedback loop method in FIG. 4.

First, the square loop as shown in FIG. 2 restores the carrier of a transmitted signal S(t) by modulating the signal by a double side band/suppressed carrier (DSB/SC) phase amplitude modulation (PAM) as expressed by the following equation 4.

$$S(t) = A(t)^* \cos(2\pi f_c t + \phi) \quad \text{[Equation 4]}$$

In Equation 4, if the base-band signal level is symmetrical centering around 0, the average expected value becomes 0 as shown in the following equation 5.

$$E[S(t)] = E[A(t)] = 0 \quad \text{[Equation 5]}$$

Accordingly, any phase information cannot be obtained from the average value of the received signal. At this time, the square loop as shown in FIG. 2 may be used as a method of driving a phase locked loop (PLL) by extracting the frequency component from $2\pi f_c t$.

Specifically, the output $S^2(t)$ of a square section 21 is obtained by the following equation 6, and the average expected value is 0, the frequency component can be extracted from $2\pi f_c t$.

$$S^2(t) = A^2(t) * \cos^2(2\pi f_c t + \phi) \quad \text{[Equation 6]}$$
$$= (1/2) * A^2(t) + (1/2) * A^2(t) * \cos(4\pi f_c t + 2\phi)$$

Accordingly, if the output $S^2(t)$ of the square section 21 passes through a band pass filter 22 having a center frequency of $2\pi f_c$, the DC component is removed, and only a component having a frequency of 2fc, phase of 2ϕ, and amplitude of ½*$A^2$(t)*H( 2fc) remains. Here, H(2fc) is the gain of the band pass filter.

In order to synchronize the oscillated frequency of a local oscillator 25 with the output of a band pass filter 22, a PLL process is performed. Specifically, the output of the band pass filter 22 and the output of the local oscillator 25 are multiplied through a multiplier 23, and the multiplied output is inputted to a loop filter 24. The output of the loop filter 24 is inputted to the local oscillator 25 again. That is, the loop filter 24 filters and accumulates the output of the multiplier 23 to detect a phase error, and output the phase error to the local oscillator 25. The local oscillator 25 generates a frequency sin($4\pi f_c$t+2ϕ) that is in proportion to the phase error, and outputs the generated frequency to the multiplier 23 and a frequency divider 26.

The frequency divider 26 divides the output of the local oscillator 25 to obtain a restored carrier of sin($4\pi f_c$t+2ϕ). Here, θ is an estimated value of ϕ, and the PLL is formed so as to effect ϕ−θ=0.

However, the carrier restoration by the above-described square loop has a phase ambiguity of 180° with respect to the phase of the received signal since the local oscillator 25 is synchronized with the frequency component of 2fc, and the restored carrier is generated through the frequency divider 26. This problem can be solved in a manner that the transmitting end performs a differential encoding, and the receiving end performs a differential decoding, but the frequency ambiguity still increases. Specifically, in case that the modulated signal contains information with M phases (i.e., the transmitted signal is given by the following equation 7), the frequency ambiguity increases to $2\pi/M$ if an M-involution element is used in replace of the square element and the frequency divider performs % M.

$$S(t)=A(t)*\cos[2\pi f_c t+\phi+(2\pi/M)*(m-1)] \quad \text{[Equation 7]}$$

where, m=1, 2, 3, . . . M.

Next, the Costas loop method will be explained.

The Costas loop as shown in FIG. 3 restores the carrier of the transmitted signal expressed by Equation 4.

In FIG. 3, outputs $Y_c$(t) and $Y_s$(t) of first and second multipliers 31 and 32 can be expressed by the following equations 8 and 9.

$$Y_c(t) = [S(t) + N(t)]*\cos(2\pi f_c t + \theta) \quad \text{[Equation 8]}$$
$$= (1/2)*[A(t) + N_c(t)]*\cos\Delta\phi +$$
$$(1/2)*N_s(t)*\sin\Delta\phi + 2f_c$$

$$Y_c(t) = [S(t) + N(t)]*\sin(2\pi f_c t + \theta) \quad \text{[Equation 9]}$$
$$= (1/2)*[A(t) + N_c(t)]*\sin\Delta\phi +$$
$$(1/2)*N_s(t)*\cos\Delta\phi + 2f_c$$

Here, the components of Δϕ=ϕ−θ, and $2f_c$ are removed passing through first and second base-band pass filters 32 and 36. The outputs of the first and second base-band pass filters 32 and 36 are multiplied by a multiplier 33 to produce an error signal as expressed by the following equation 10.

$$e(t) = (1/8)*\{[A(t) + N_c(t)]^2 - N_s^2(t)\}*\sin2\Delta\phi - \quad \text{[Equation 10]}$$
$$(1/4)*N_s(t)*[A(t) + N_c(t)]*\cos2\Delta\phi$$

In Equation 10, it can be recognized that the error signal e(t) is composed of a desired signal component of $A^2$(t)*sin 2Δϕ, component of signal*noise, and component of noise*noise. Here, a matched filter may be suitably used as the first and second base-band pass filters 32 and 36. If the matched filter is used, the noise mixed to the loop can be reduced.

The operation of a loop filter 37 that received the output of the multiplier 33 and the operation of a local oscillator 28 are the same as those in the above-described square loop method, and the detailed explanation thereof will be omitted. That is, the Costas loop method is equivalent to the square loop method, and has the phase ambiguity of 180°.

Next, the decision feedback loop method will be explained.

The above-described Costas loop method has the problem in that as the error signal is multiplied by the noise, the noise is amplified to its square value. This problem can be solved by adding a decision element to one side of the Costas loop as shown in FIG. 3. This type of carrier restoration is called the decision feedback loop method, which is illustrated in FIG. 4. Referring to FIG. 4, a sampler 43 and a decision element 45 are arranged between a first base-band pass filter 42 and a multiplier 49 of the carrier restoration apparatus of FIG. 3. Here, the sampler 43 receives from a timing restoration section 44 timing errors of present symbols produced through the base-band signal process, and performs an interpolation to reduce the errors among the output signals of the first base-band pass filter 42. Also, the decision element 45 generates and outputs to the multiplier 49 decision signals matching respective signal levels of the base-band signals outputted from the sampler 43.

If there is no error in the decision element in FIG. 4, the output of the decision element 45 will be the base-band signal A(t) from which the noise is removed. Accordingly, if the phase error signal e(t) is developed, the square component of the noise is vanished as shown in the following equation 1.

$$e(t) = (1/2)*A(t)*\{[A(t) + N_c(t)]*\sin\Delta\phi - \quad \text{[Equation 11]}$$
$$N_s(t)*\cos\Delta\phi\} + 2f_c$$
$$= (1/2)*A^2(t)*\sin\Delta\phi + (1/2)*$$
$$A(t)*[N_c(t)*\sin\Delta\phi - N_s(t)*\cos\Delta\phi] + 2f_c$$

However, the decision feedback loop method as described above also has the following problems.

First, since an elaborate high-quality tuner should be used according to a small acquisition/tracking range, the cost for preparing the tuner is increased. That is, a tuner with a small frequency offset and small phase jitter during the carrier restoration has a good performance, and such a tuner having the good performance is typically expensive.

Second, the BER performance of the receiver is lowered due to a large residual phase jitter.

Third, the acquisition/tracking performance with respect to a small input SNR deteriorates. That is because if the receiving power (i.e., SNR) of the input signal is small, the error detection section of the conventional carrier restoration section produces an inaccurate error.

Fourth, the acquisition/tracking performance with respect to the ISI/ghost channel deteriorates widely. Even in the channel having a strong ISI/ghost, the error detection section also produces an inaccurate error in the same manner.

SUMMARY OF THE INVENTION

Accordingly, the present invention is directed to a carrier restoration apparatus and method that substantially obviates one or more problems due to limitations and disadvantages of the related art.

An object of the present invention is to provide a carrier restoration apparatus and method which can improve the frequency acquisition performance and the phase tracking performance by separately constructing a loop for frequency acquisition and a loop for phase tracking.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a carrier restoration apparatus comprises a phase/frequency detection section for obtaining a phase error between demodulated signal constellations and blind decision signal constellations or decision-directed decision signal constellations, and extracting a polarity of the phase error, a PLL section for frequency acquisition for extracting a corresponding frequency offset by accumulating pre-calculated bandwidth values according to the polarity of the phase error, generating digital type sine and cosine waves according to the extracted frequency offset, and then generating a base-band digital signal where the frequency offset of the carrier is acquired by demodulating a pass-band digital signal by the sine and cosine waves, a PLL section for phase tracking for extracting a corresponding phase jitter by accumulating the pre-calculated bandwidth values according to the polarity of the phase error, generating digital type sine and cosine waves according to the extracted phase jitter, and then generating the demodulated signal constellations where the phase jitter is tracked by demodulating the base-band digital signal by the sine and cosine waves, a blind decision section for extracting the polarity of the demodulated signal constellations generated from the PLL section for phase tracking, and generating blind signal constellations by slicing the demodulated signal constellations according to the extracted polarity, and a decision-directed decision section for generating decision-directed decision signal constellations matching respective signal levels of the demodulated signal constellations generated from the PLL section for phase tracking.

It is preferable that the phase/frequency detection section operates in a blind mode for extracting the polarity by obtaining the phase error between the demodulated signal constellation and the blind decision signal constellations in order to acquire the frequency offset, or in a decision-directed mode for extracting the polarity by obtaining the phase error between the demodulated signal constellation and the decision-directed decision signal constellations in order to track the phase jitter. Thus, it is also preferable that the apparatus further comprises a lock detection section for controlling selection of the blind mode and the decision-directed mode of the phase/frequency detection section.

Preferably, a carrier restoration method according to the present invention performs the above-described carrier restoration process by software.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 17A and 17B are views illustrating the geometrical characteristic of a characteristic function of a phase/frequency detector in a blind mode, wherein FIG. 17A shows an example in case that the phase of the demodulated signal constellations is larger than the phase of the decision signal constellations, and FIG. 17B shows an example in case that the phase of the demodulated signal constellations is smaller than the phase of the decision signal constellations of the demodulated signal; and FIGS. 18A and 18B are views illustrating the geometrical characteristic of a characteristic function of a phase/frequency detector in a decision-directed mode, wherein FIG. 18A shows an example in case that the phase of the demodulated signal constellations is larger than the phase of the decision signal constellations, and FIG. 18B shows an example in case that the phase of the demodulated signal constellations is smaller than the phase of the decision signal constellations of the demodulated signal.

DETAILED DESCRIPTION OF THE PREFERRED EMBODIMENTS

Reference will now be made in detail to the preferred embodiments of the present invention, examples of which are illustrated in the accompanying drawings.

Figure 1:
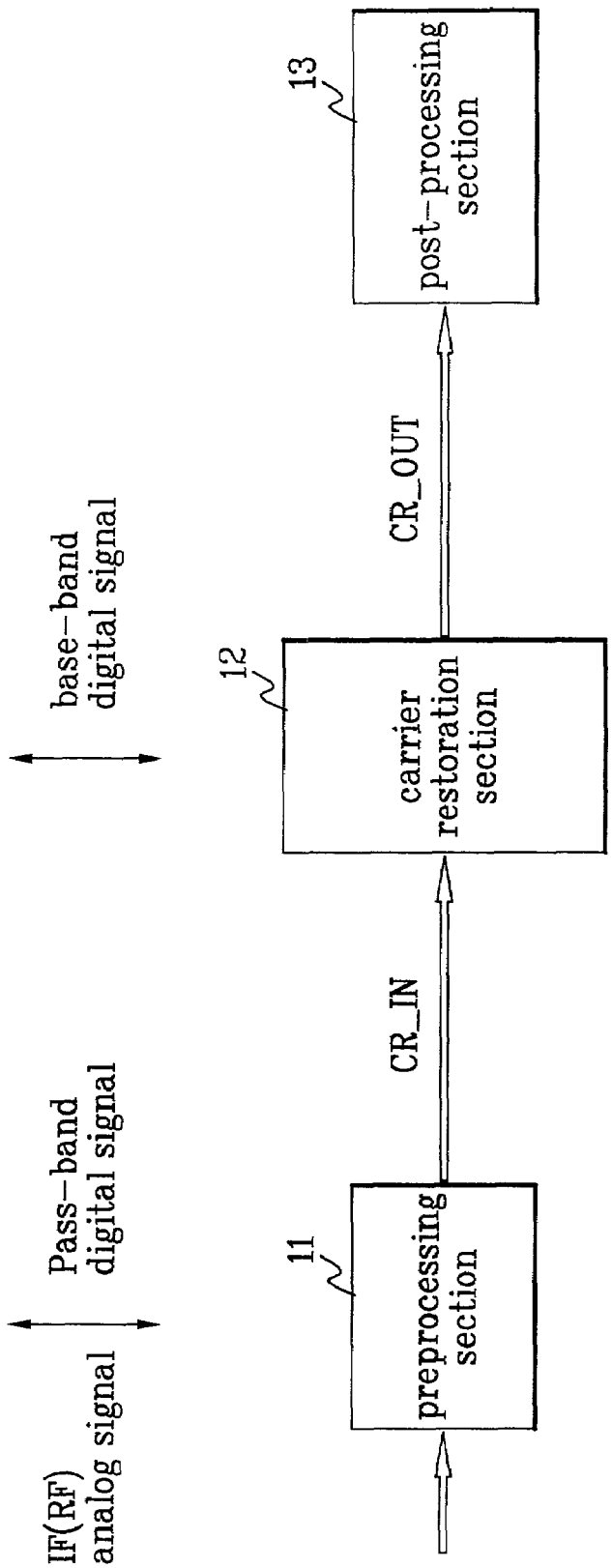
FIG. 1 is a schematic view illustrating the construction of a general TV receiver.
Figure 2:
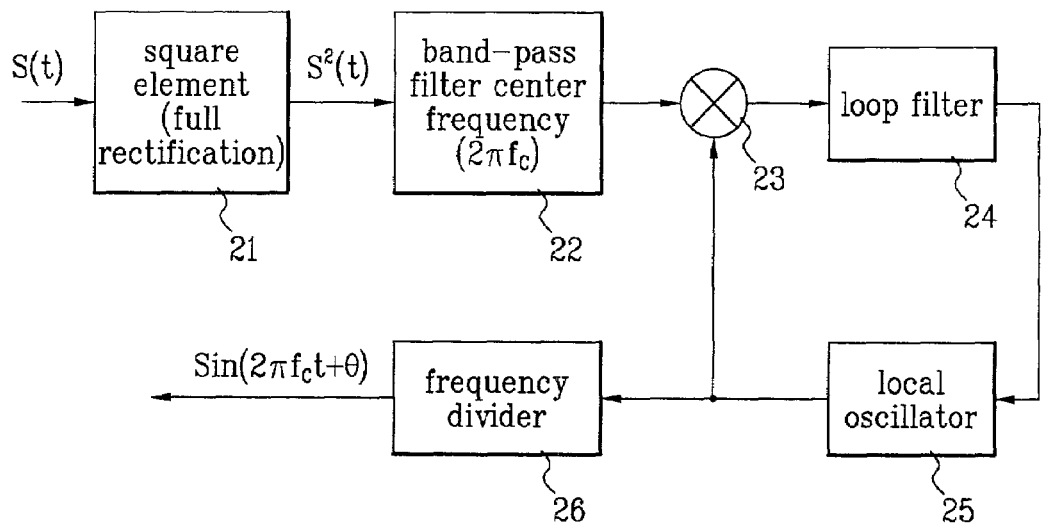
FIG. 2 is a block diagram illustrating the construction of a conventional carrier restoration apparatus using a square loop method.
Figure 3:
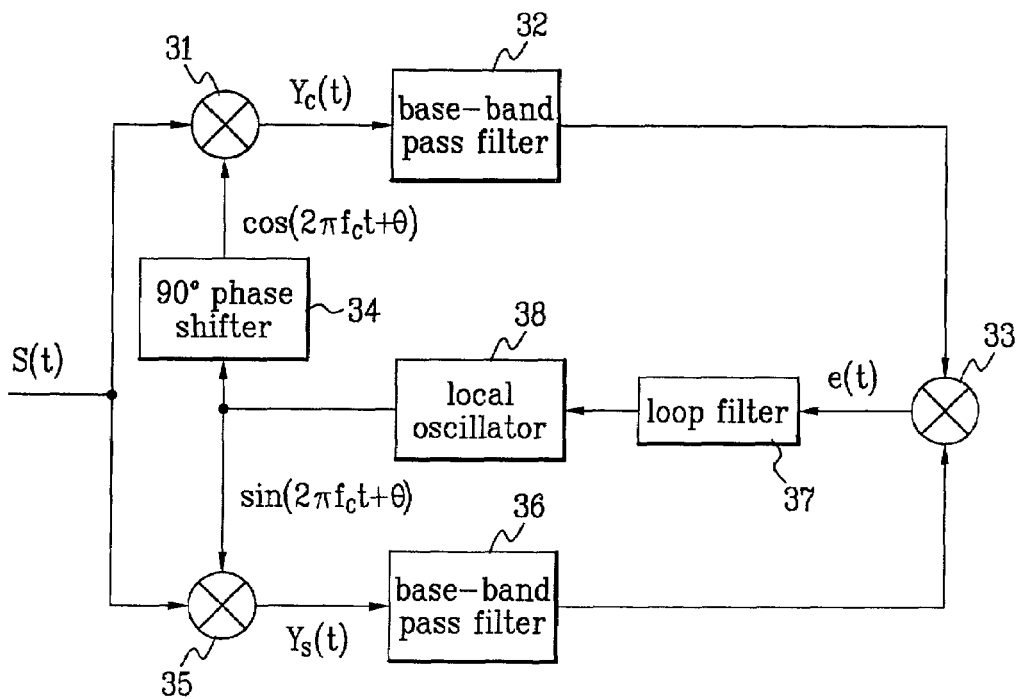
FIG. 3 is a block diagram illustrating the construction of a conventional carrier restoration apparatus using a Costas loop method.
Figure 4:
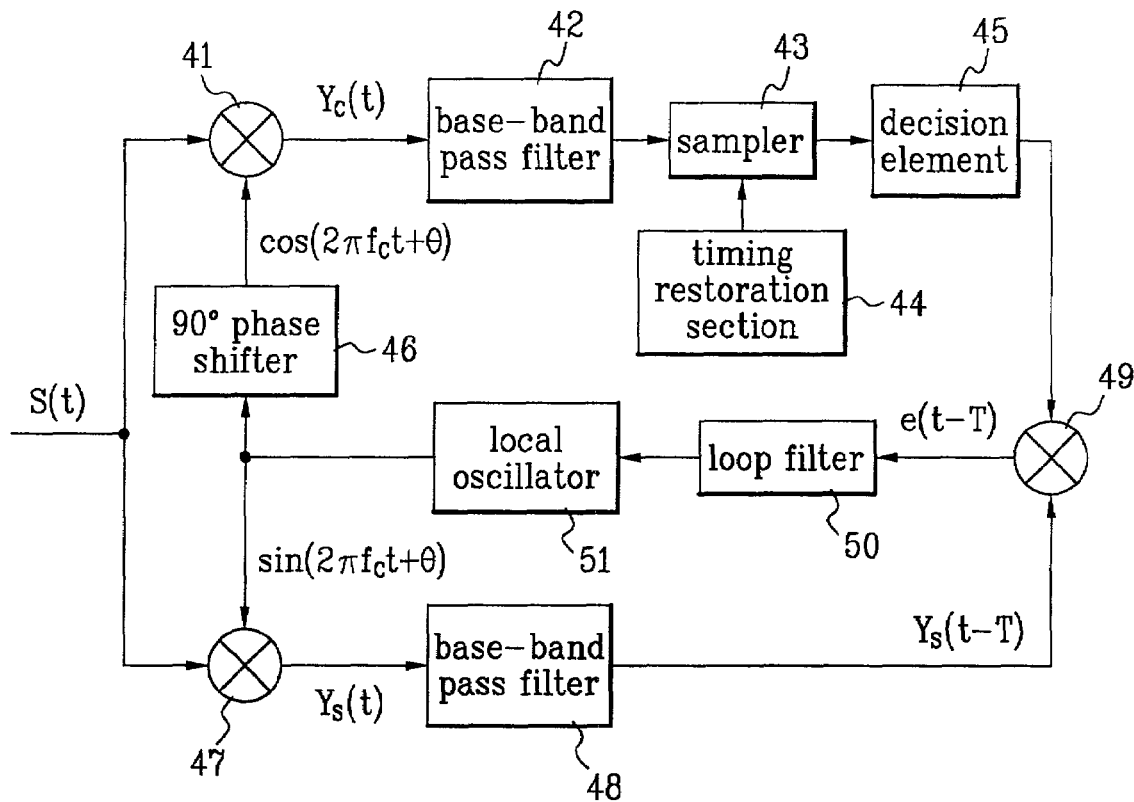
FIG. 4 is a block diagram illustrating the construction of a conventional carrier restoration apparatus using a decision feedback loop method.
Figure 5:
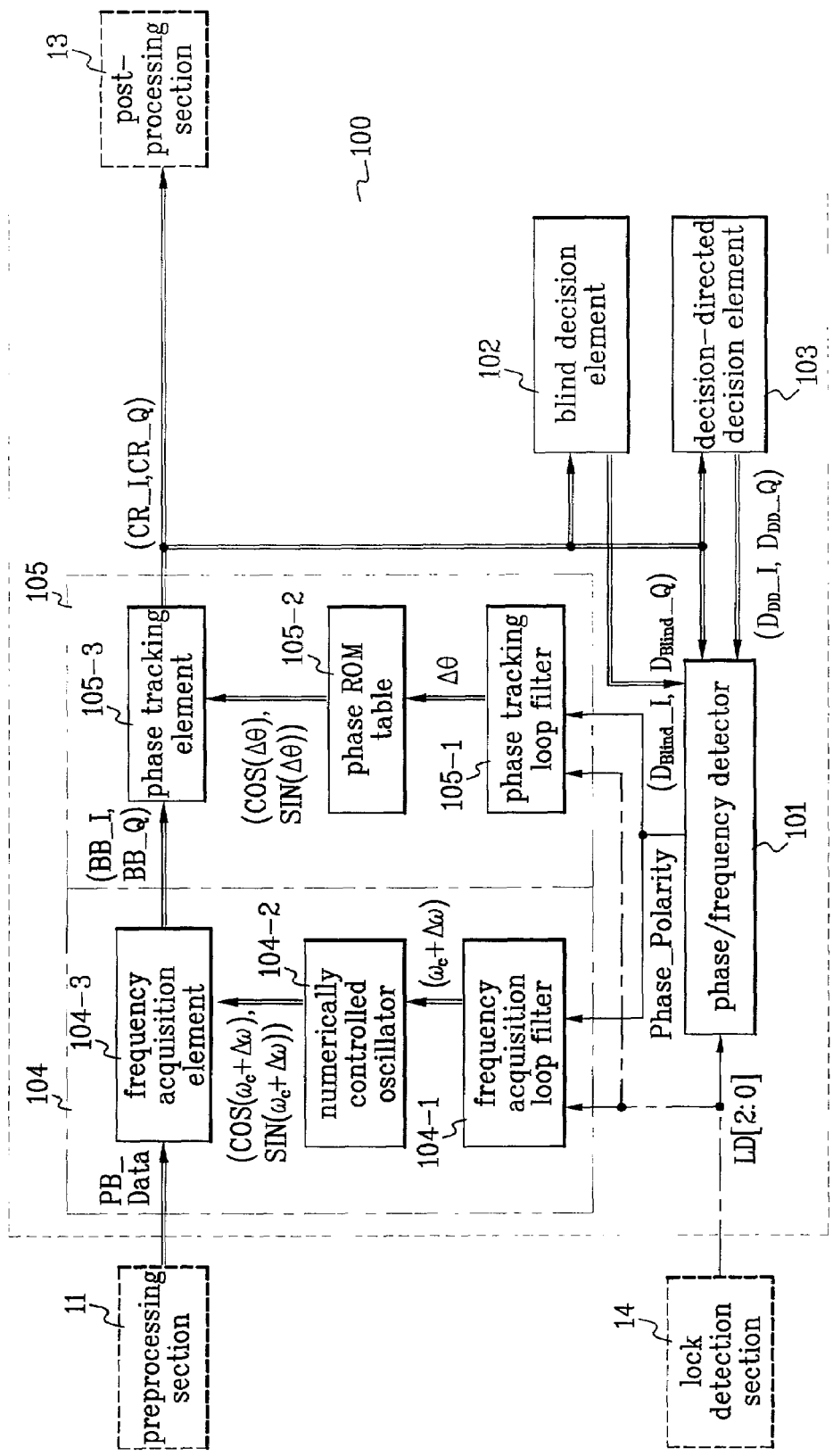
FIG. 5 is a block diagram illustrating the construction of a carrier restoration apparatus according to the present invention applied to a TV receiver.

FIG. 5 is a block diagram illustrating the construction of a carrier restoration apparatus according to the present invention applied to a TV receiver. Referring to FIG. 5, a carrier restoration section 100 includes a PLL section 104 for frequency acquisition, a PLL section 105 for phase tracking, and a phase/frequency detector 101 used in common for the different PLL section 104 for frequency acquisition and PLL section 105 for phase tracking.

Also, the carrier restoration section 100 includes a blind decision element 102 and a decision-directed decision element 103 for determining the kind of decision signal constellations from an output of the PLL section for phase tracking, and operating the phase/frequency detector 101 in a blind mode or decision-directed mode.

A lock detection section 14 determines an operation mode of the phase/frequency detector 101 of the carrier restoration section 100, and outputs a corresponding control signal LD[2:0] to the phase/frequency detector 101 of the carrier restoration section 100, a frequency acquisition loop filter 104-1 of the PLL section 104 for frequency acquisition, and a phase tracking loop filter 105-1 of the PLL section 105 for phase tracking. The selection of an operation mode of the phase/frequency detector 101 is automatically performed by the lock control signal LD[2:0] of the lock detection section 14.

Here, the PLL section 104 for frequency acquisition includes the frequency acquisition loop filter 104-1 a numerically controlled oscillator (NCO) 104-2 and a frequency acquisition element 104-3. The PLL section 105 for phase tracking includes the phase tracking loop filter 105-1, a phase ROM table 105-2, and a phase tracking element 105-3.

The phase/frequency detector 101 calculates the phase error in two modes, i.e., a blind mode and a decision-directed mode, according to the kind of decision signal constellations determined by the blind decision element 102 and the decision-directed decision element 103.

The phase error generated from the phase/frequency detector 101 is expressed as a polarity, and is outputted to the PLL section 104 for frequency acquisition and the PLL section 105 for phase tracking.

Figure 6:
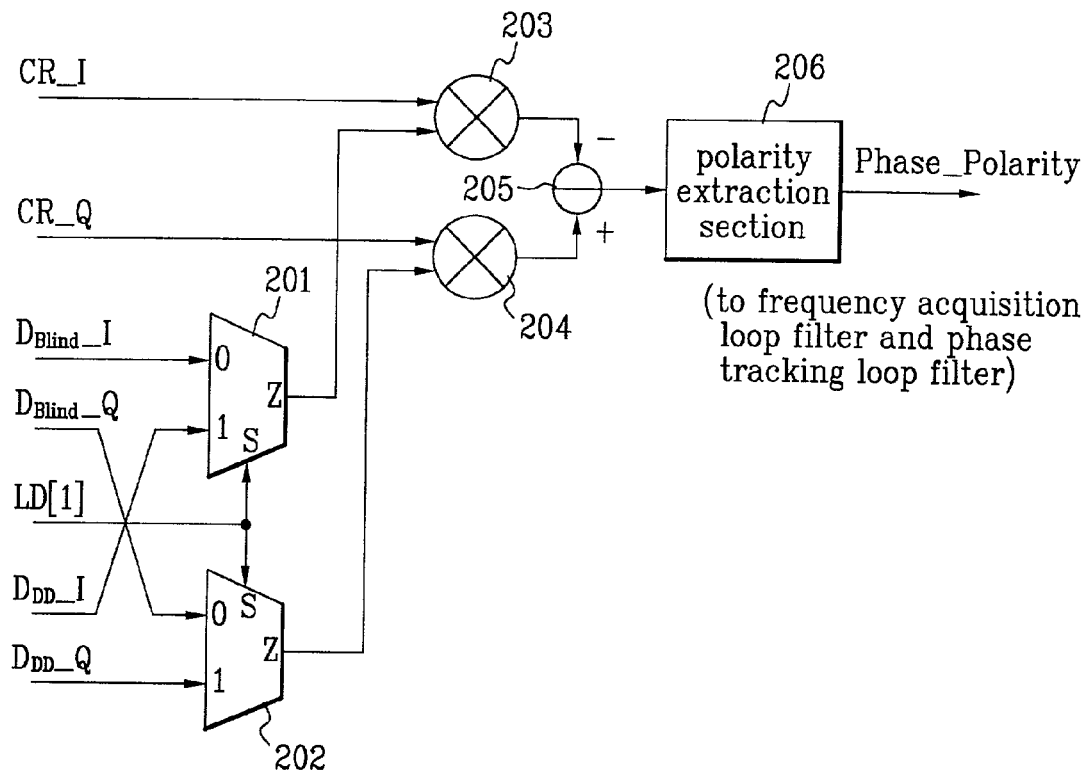
FIG. 6 is a block diagram illustrating the detailed construction of a phase/frequency detection section of FIG. 5.

FIG. 6 is a block diagram illustrating the detailed construction of the phase/frequency detection section. The phase/frequency detection section 101 includes a first multiplexer 201 for selecting and outputting one of an I blind decision signal $D_{Blind\_}I$ outputted from the blind decision element 102 and an I decision-directed decision signal $D_{DD\_}I$ outputted from the decision-directed decision element 103 according to the control signal LD[1] generated from the lock detection section 14, a second multiplexer 202 for selecting and outputting one of a Q blind decision signal $D_{Blind\_}Q$ outputted from the blind decision element 102 and a Q decision-directed decision signal $D_{DD\_}Q$ outputted from the decision-directed decision element 103 a multiplier 203 for multiplying an output of the first multiplexer 201 by an I demodulated signal constellation CR_I generated from the phase tracking element 105-3, a multiplier 204 for multi-plying an output of the second multiplexer 202 by a Q demodulated signal constellation CR_Q generated from the phase tracking element 105-3, a subtracter 205 for calculating a difference between outputs of the two multipliers 203 and 204 and outputting the phase error, and a polarity extraction section 206 for detecting a polarity of the phase error Phase_Polarity outputted from the subtracter 205 in the unit of a symbol and outputting the polarity of the phase error to the frequency acquisition loop filter 104-1 and the phase tracking loop filter 105-1.

Figure 7:
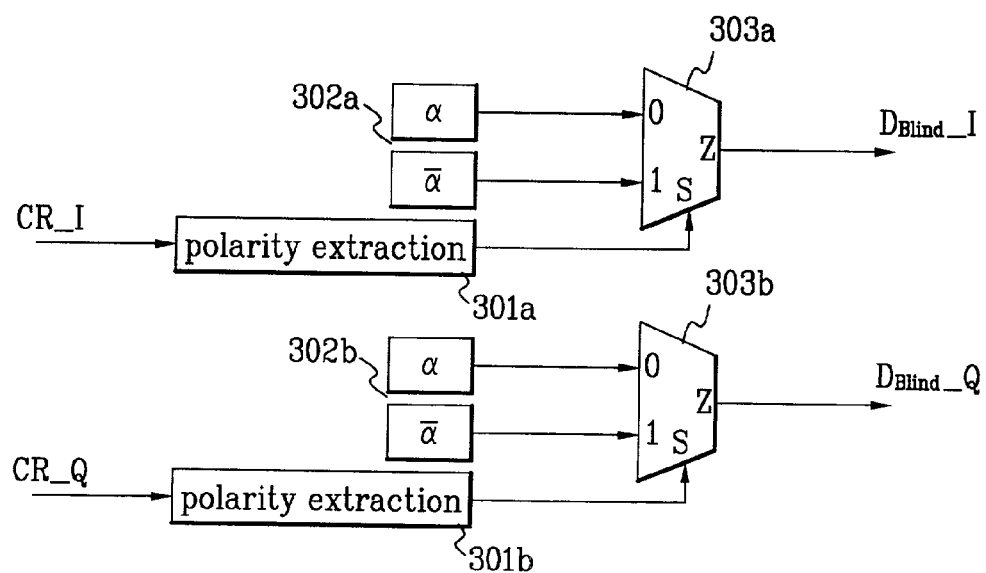
FIG. 7 is a block diagram illustrating the detailed construction of a blind decision section of FIG. 5.

FIG. 7 is a block diagram illustrating the detailed construction of the blind decision section. The blind decision section 102 includes a polarity extraction section 301a for extracting a polarity of an I demodulated signal constellation CR_I generated from the phase tracking section 105-3 in the unit of a symbol, a third multiplexer 303a for generating an I blind decision signal constellation $D_{Blind\_}I$ obtained by slicing by two levels the demodulated signal constellation according to the polarity extracted from the polarity extraction section 301a to output the I blind decision signal constellation $D_{Blind\_}I$ to the phase/frequency detector 101, a polarity extraction section 301b for extracting a polarity of a Q demodulated signal constellation CR_Q generated from the phase tracking section 105-3 in the unit of a symbol, and a fourth multiplexer 303b for generating a Q blind decision signal constellation $D_{Blind\_}Q$ obtained by slicing by two levels the demodulated signal constellation according to the polarity extracted from the polarity extraction section 301b to output the Q blind decision signal constellation $D_{Blind\_}Q$ to the phase/frequency detector 101.

The blind decision element 102 generates the blind decision signal constellations $D_{Blind\_}I$ and $D_{Blind\_}Q$ obtained by slicing by two levels the demodulated decision signal constellations CR_I and CR_Q according to the polarities of the demodulated signal constellations CR_I and CR_Q generated from the phase tracking element 105-3 irrespective of the level values of 4/16/64/256 QAM.

Figure 8:
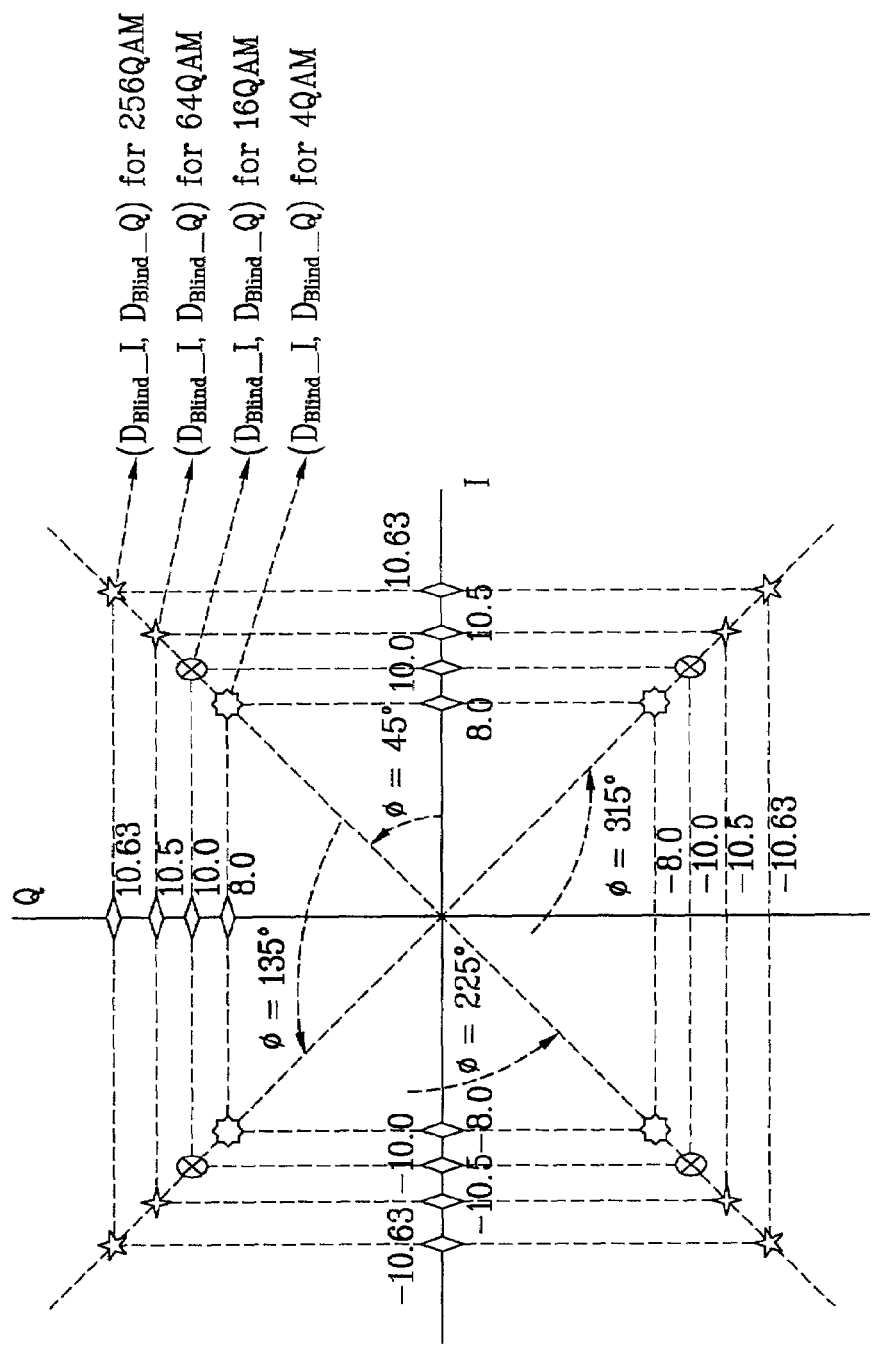
FIG. 8 is a view illustrating an example of decision signal constellations of a blind decision element of 4/16/64/256 QAM.

FIG. 8 is a view illustrating an example of the blind decision signal constellations of 4/16/64/256 QAM.

Figure 9:
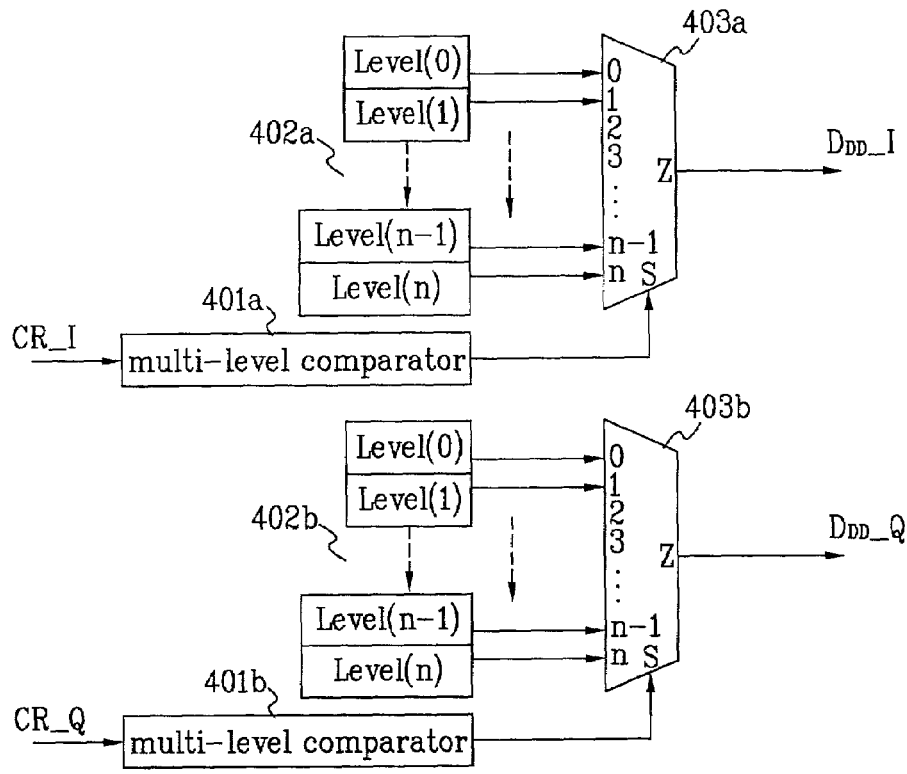
FIG. 9 is a block diagram illustrating the detailed construction of a decision-directed decision element of FIG. 5.

FIG. 9 is a block diagram illustrating the detailed construction of the decision-directed decision element. The decision-directed decision element 103 includes a multi-level comparator 401a for comparing levels of an I demodulated signal constellation CR_I generated from the phase tracking element 105-3, a fifth multiplexer 403a for selecting an I decision signal constellation $D_{DD\_}I$ matching the respective signal levels of the I demodulated signal constellation CR_I according to an output of the multi-level comparator 401a to output the I decision signal constellation $D_{DD\_}I$ to the phase/frequency detector 101, a multi-level comparator 401b for comparing levels of a Q demodulated signal constellation CR_Q generated from the phase tracking element 105-3, a sixth multiplexer 403b for selecting a Q decision signal constellation $D_{DD\_}Q$ matching the respective signal levels of the Q demodulated signal constellation CR_Q according to an output of the multi-level comparator 401b to output the Q decision signal constellation $D_{DD\_}Q$ to the phase/frequency detector 101.

The decision-directed decision element 103 generates the decision signal constellations $D_{DD\_}I$ and $D_{DD\_}Q$ matching the respective signal levels of the demodulated signal constellations CR_I and CR_Q generated from the phase tracking element 105-3.

Figure 10:
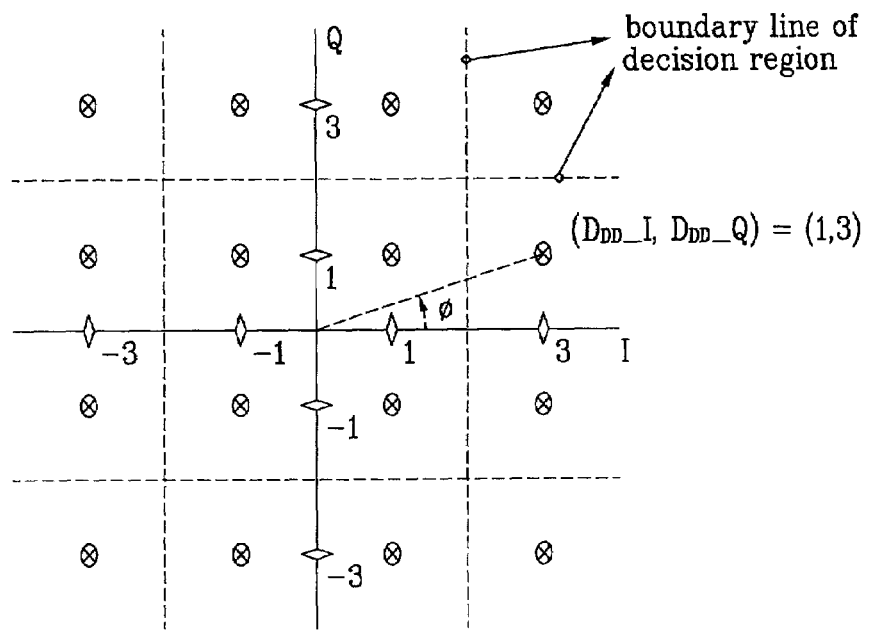
FIG. 10 is a view illustrating an example of constellations of a 16 QAM decision-directed decision signal.

FIG. 10 is a view illustrating an example of constellations of the 16 QAM decision-directed decision signal.

Figure 11:
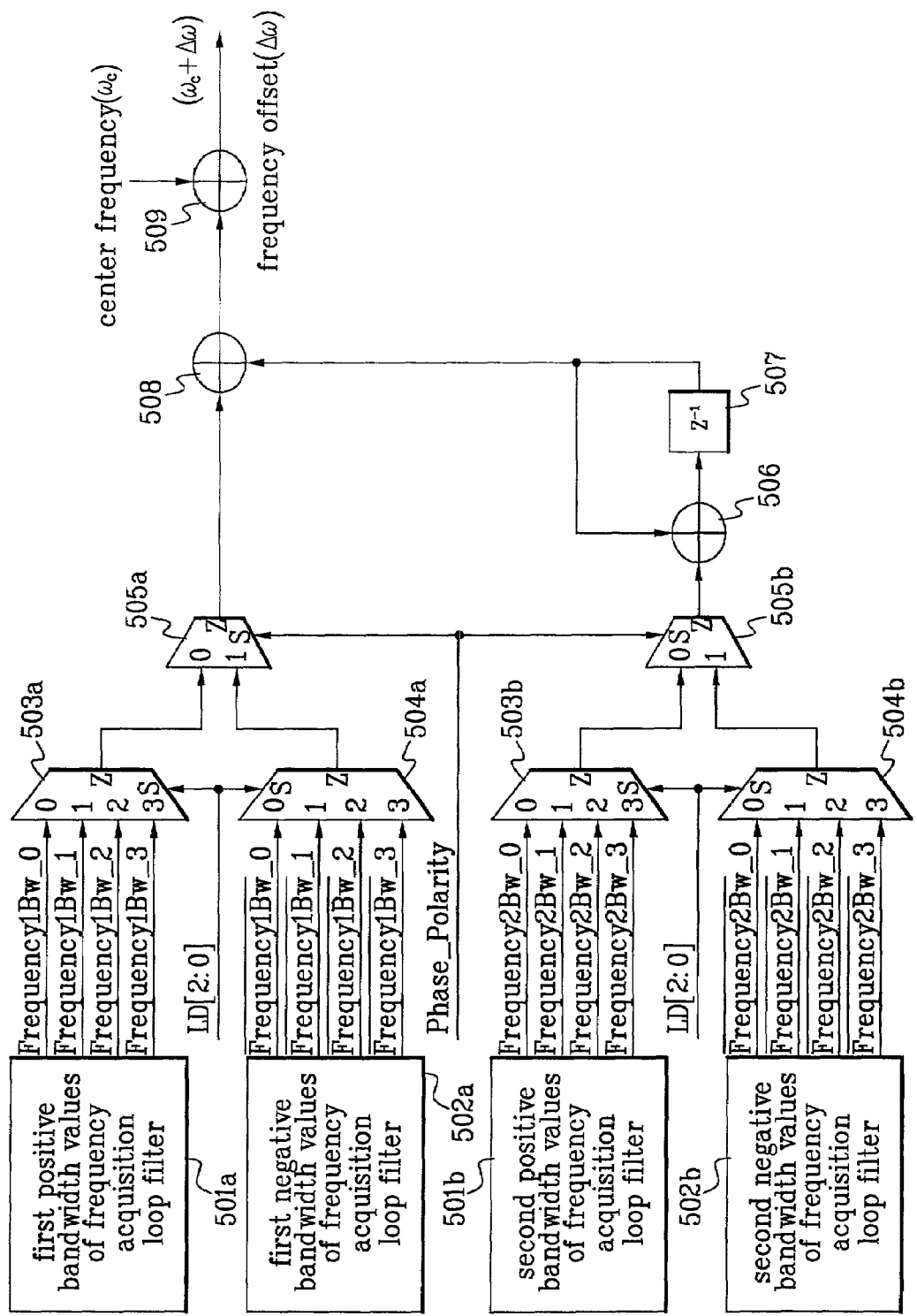
FIG. 11 is a block diagram illustrating the detailed construction of a frequency acquisition loop filter of FIG. 5.

FIG. 11 is a block diagram illustrating the detailed construction of the frequency acquisition loop filter. The frequency acquisition loop filter 104-1 includes a seventh multiplexer 503a for selecting one among a plurality of pre-calculated first positive bandwidth values 501a according to the control signal LD[2:0] of the lock detection section 14, an eighth multiplexer 504a for selecting one among a plurality of pre-calculated first negative bandwidth values 502a according to the control signal LD[2:0] of the lock detection section 14, a ninth multiplexer 505a for selecting one of outputs of the seventh and eighth multiplexers 503a and 504a according to the polarity of the phase error detected by the phase/frequency detector 101, a tenth multiplexer 503b for selecting one among a plurality of pre-calculated second positive bandwidth values 501b according to the control signal LD[2:0] of the lock detection section 14, an eleventh multiplexer 504b for selecting one among a plurality of pre-calculated second negative bandwidth values 502b according to the control signal LD[2:0] of the lock detection section 14, a twelfth multiplexer 505b for selecting one of outputs of the tenth and eleventh multiplexers 503b and 504b according to the polarity of the phase error detected by the phase/frequency detector 101, an adder 506 for adding an output of the twelfth multiplexer 505b and a feedback signal delayed by one symbol, a delay 507 for delaying an output of the adder 506 by one symbol and feeding back the delayed output to the adder 506, an adder 508 for adding an output of the ninth multiplexer 505a and an output of the delay 507, and an adder 509 for generating a frequency offset by adding an output of the adder 508 and an intermediate frequency $\omega_c$ of the carrier externally provided, and outputting the frequency offset to the numerically controlled oscillator 104-2. Here, the adders 506 and 508, and the delay 507 comprise a kind of integrator, and generate the frequency offset $\Delta\omega$ by accumulating output results of the ninth and twelfth multiplexers 505a and 505b in the unit of a symbol.

Specifically, in order to acquire the corresponding frequency offset $\Delta\omega$, the frequency acquisition loop filter 104-1 serves as a first digital low-pass filter for generating the corresponding frequency offset $\Delta\omega$ by accumulating values of the positive or negative bandwidths Frequency#BW_# according to the polarity of the phase error.

At this time, a gear shifting of the filter bandwidth is automatically performed by the lock control signal LD[2:0] of the lock detection section 14.

Figure 12:
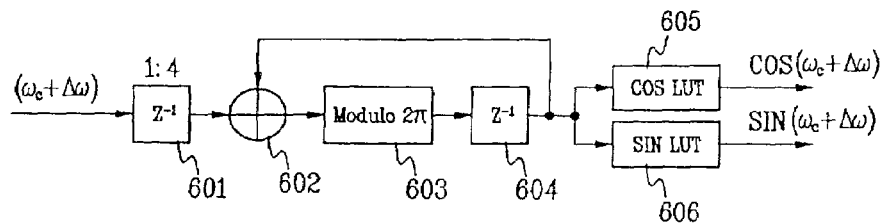
FIG. 12 is a block diagram illustrating the detailed construction of a numerically controlled oscillator (NCO) of FIG. 5.

FIG. 12 is a block diagram illustrating the detailed construction of the numerically controlled oscillator (NCO). The NCO 104-2 includes a delay 601 for delaying by one symbol a corresponding frequency offset ($\omega_c+\Delta\omega$) outputted from the frequency acquisition loop filter 104-1 an adder 602 for adding an output of the delay 601 and a feedback signal, a modulo $2\pi$ 603 for calculating an output of the adder 602 by a $2\pi$ module, an adder 604 for delaying by one symbol an output of the modulo $2\pi$ 603 and feeding back the delayed output to the adder 602, a cosine lookup table 605 for storing a plurality of cosine waves, selecting and outputting to the frequency acquisition element 104-3 a cosine wave $\cos(\omega_c+\Delta\omega)$ corresponding to an output of the delay 604, and a sine lookup table 606 for storing a plurality of sine waves, selecting and outputting to the frequency acquisition element 104-3 a sine wave $\sin(\omega_c+\Delta\omega)$ corresponding to the output of the delay 604. Here, the adder 602, modulo $2\pi$ 603, and delay 604 comprise a simple integrator.

The NCO 104-2 generates the sine wave $\sin(\omega_c+\Delta\omega)$ and the cosine wave $\cos(\omega_c+\Delta\omega)$ in a digital form according to the corresponding frequency offset ($\omega_c+\Delta\omega$) generated from the frequency acquisition loop filter 104-1.

Figure 13:
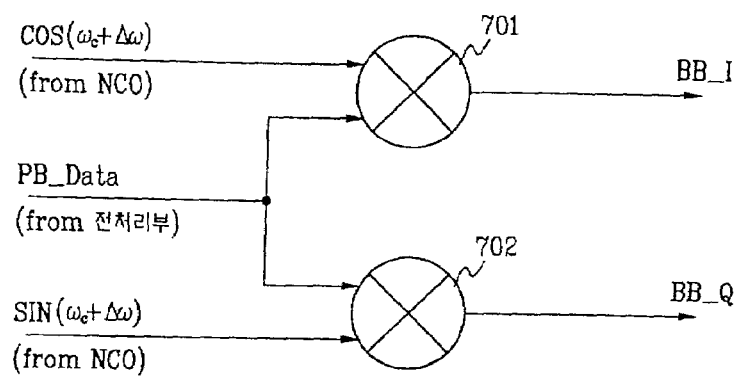
FIG. 13 is a block diagram illustrating the detailed construction of a frequency acquisition element of FIG. 5.

FIG. 13 is a block diagram illustrating the detailed construction of the frequency acquisition element. The frequency acquisition element 104-3 includes a multiplier 701 for shifting an I base-band digital signal BB_I by multiplying the cosine wave $\cos(\omega_c+\Delta\omega)$ outputted from the NCO 104-2 and an I pass-band digital signal PB_Data outputted from the preprocessing section 11, and a multiplier 702 for shifting a Q base-band digital signal BB_Q by multiplying the sine wave $\sin(\omega_c+\Delta\omega)$ outputted from the NCO 104-2 and a Q pass-band digital signal PB_Data outputted from the preprocessing section 11.

Specifically, the frequency acquisition element 104-3 converts the pass-band digital signal PB_Data outputted from the preprocessing section 11 where the frequency offset $\Delta\omega$ is acquired by demodulating the pass-band digital signal PB_Data by the cosine wave $\cos(\omega_c+\Delta\omega)$ and the sine wave $\sin(\omega_c+\Delta)$ generated from the NCO 104-2.

Figure 14:
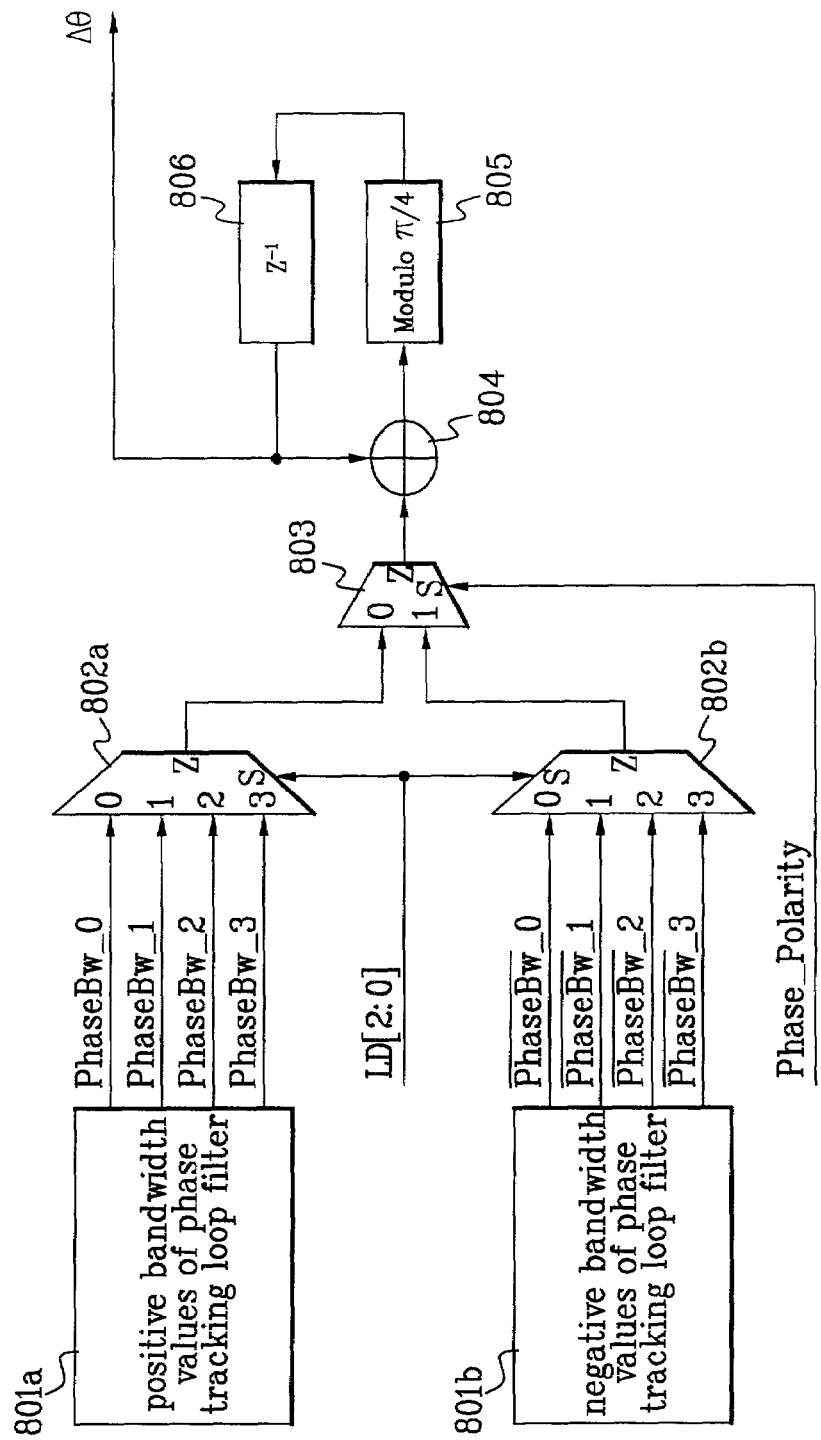
FIG. 14 is a block diagram illustrating the detailed construction of a phase tracking loop filter of FIG. 5.

FIG. 14 is a block diagram illustrating the detailed construction of the phase tracking loop filter. The phase tracking loop filter 105-1 includes thirteenth multiplexer 802a for selecting one among a plurality of pre-calculated positive bandwidth values 801a according to the control signal LD[2:0] of the lock detection section 14, a fourteenth multiplexer 802b for selecting one among a plurality of pre-calculated negative bandwidth values 801b according to the control signal LD[2:0] of the lock detection section 14, a fifteenth multiplexer 803 for selecting one of outputs of the thirteenth and fourteenth multiplexers 802a and 802b according to the polarity of the phase error detected by the phase/frequency detector 101, an adder 804 for adding an output of the fifteenth multiplexer 803 and a feedback signal, a modulo $\pi/4$ 805 for calculating an output of the adder 804 by a $\pi/4$ module, and a delay 806 for delaying an output of the modulo $\pi/4$ 805 by one symbol, feeding back the delayed output to the adder 804, and outputting the delayed output to a phase ROM table 105-2. Here, the adder 804, modulo $\pi/4$ 805, and delay 806 comprise a simple integrator.

Specifically, in order to track the corresponding phase jitter $\Delta\theta$, the phase tracking loop filter 105-1 serves as a first digital low-pass filter for generating the corresponding phase jitter $\Delta\theta$ by accumulating values of bandwidth PhaseBw_# of the phase tracking loop filter according to the polarity of the phase error.

At this time, a gear shifting of the filter bandwidth of the phase tracking loop filter 105-1 is automatically performed by the lock control signal LD[2:0] of the lock detection section 14.

Figure 15:
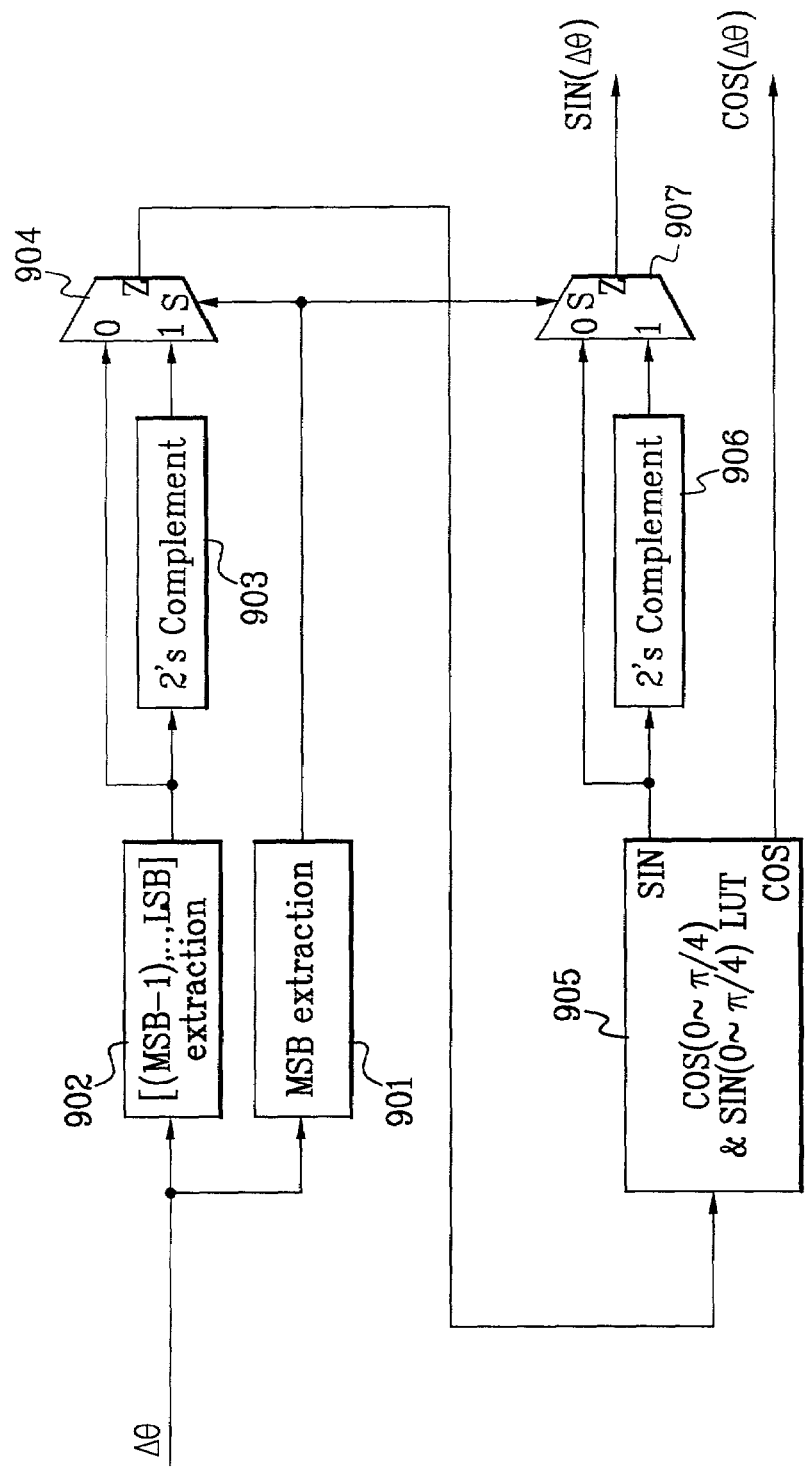
FIG. 15 is a block diagram illustrating the detailed construction of a phase ROM table of FIG. 5.

FIG. 15 is a block diagram of the detailed construction of the phase ROM table. The phase ROM table 105-2 includes an MSB extraction section 905 for extracting only the most significant bit (MSB) of the phase jitter $\Delta\theta$ outputted from the phase tracking loop filter 105-1, a lower bit extraction section 902 for extracting remaining bits except for the MSB of the phase jitter $\Delta\theta$ outputted from the phase tracking loop filter 105-1, a 2's complement section 903 for obtaining a complement on 2 with respect to an output of the lower bit extraction section 902, a sixteenth multiplexer 904 from selecting one of an output of the lower bit extraction section 902 and an output of the 2's complement section 903 according to an output of the MSB extraction section 901, a lookup table 905 for selecting and outputting the sine and cosine waves corresponding to an output of the sixteenth multiplexer 904, a 2's complement section 906 for obtaining a complement on 2 with respect to the sine wave selected and outputted by the lookup table 905, and a seventeenth multiplexer 907 for selecting one of the sine wave outputted from the lookup table 906 and the sine wave outputted from the 2's complement section 903 according to the output of the MSB extraction section 901.

That is, phase ROM table 105-2 generates the sine wave sin(Δθ) and the cosine wave cos(Δθ) according to the corresponding phase jitter Δθ generated from the phase tracking loop filter 105-1.

Figure 16:
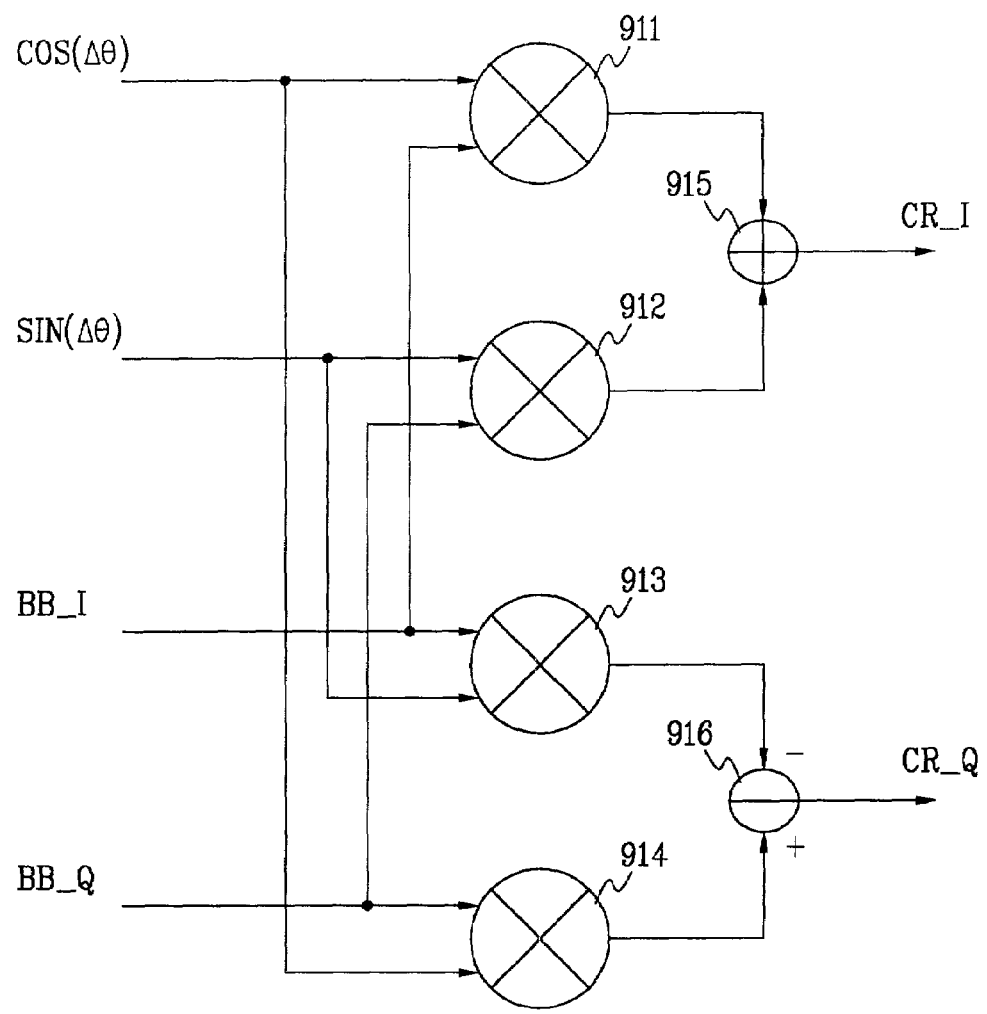
FIG. 16 is a block diagram illustrating the detailed construction of a phase tracking element of FIG. 5.

FIG. 16 is a block diagram illustrating the detailed construction of the phase tracking element. The phase tracking element 105-3 includes a multiplier 911 for multiplying an I base-band digital signal BB_I outputted from the phase acquisition element 104-3 and the cosine wave cos(Δθ) outputted from the phase ROM table 105-2, a multiplier 912 for multiplying a Q base-band digital signal BB_Q outputted from the phase acquisition element 104-3 and the sine wave sin(Δθ) outputted from the phase ROM table 105-2, an adder 915 for adding outputs of the two multipliers 911 and 912 and outputting an I demodulated signal constellation CR_I where the carrier is restored, a multiplier 913 for multiplying the I base-band digital signal BB_I outputted from the phase acquisition element 104-3 and the sine wave sin(Δθ) outputted from the phase ROM table 105-2, a multiplier 914 for multiplying the Q base-band digital signal BB_Q outputted from the phase acquisition element 104-3 and the cosine wave cos(Δθ) outputted from the phase ROM table 105-2, and an adder 916 for obtaining subtraction of outputs of the two multipliers 913 and 914 and outputting a Q demodulated signal constellation CR_Q where the carrier is restored.

That is, the phase tracking element 1-5-3 tracks the corresponding phase jitter Δθ of the base-band digital signals BB_I and BB_Q shifted in the frequency acquisition element 104-3 using the cosine wave cos(Δθ) and the sine wave sin(Δθ) generated from the phase ROM table 105-2, and generates the base-band digital signals CR_I and CR_Q where the carrier is completely restored.

The acquisition/tracking performance of the carrier restoration section according to the present invention is determined through an algorithm of the phase/frequency detector 101 and an implementation method of PLL.

Accordingly, the phase/frequency detector 101 of the carrier restoration section 100 according to the present invention acquires the frequency offset (Δθ) and tracks the residual phase jitter (Δθ) in two modes. That is, the phase/frequency detector 101 performs a blind mode for acquiring the frequency offset (Δθ) and a decision-directed mode for tracking the residual phase jitter according to the kind of the used decision signal constellations (I.e., outputs of the blind decision element 102 and decision-directed decision element 103). At this time, the mode selection of the phase/frequency detector 101 is automatically performed by the lock detection section 14.

Specifically, two PLLs are provided in the carrier restoration section 100. For example, the carrier restoration section 100 is composed of the PLL section 104 for frequency acquisition for acquiring the frequency offset (Δθ) and the PLL section 105 for phase tracking for tracking the residual phase jitter (Δθ). At this time, the phase/frequency detector 101 is commonly used by the PLL section 104 for frequency acquisition and the PLL section 105 for phase tracking.

Also, the phase/frequency detector 101 extracts the polarity by obtaining the phase error, and then expresses the phase error by the polarity. This feature reduces the circuit complexity when implementing the loop filter circuit.

FIG. 6 is a block diagram illustrating the detailed construction of the phase/frequency detection section. The first and second multiplexers 201 and 202 selects and outputs to the multipliers 203 and 204 one of the blind decision signal constellations $D_{Blind\_}I$ and $D_{Blind\_}Q$ generated from the blind decision element 102 and the decision-directed decision signal constellations $D_{DD\_}I$ and $D_{DD\_}Q$ generated from the decision-directed decision element 103 according to the control signal LD[1] generated from the lock detection section 14. The multiplier 203 multiplies the I demodulated signal constellation CR_I outputted from the phase tracking element 105-3 by the I demodulated signal constellation $D_{Blind\_}I$ or $D_{DD\_}I$ to output the multiplied result to the subtracter 205. The multiplier 204 multiplies the Q demodulated signal constellation CR_Q outputted from the phase tracking element 105-3 by the Q demodulated signal constellation $D_{Blind\_}Q$ or $D_{DD\_}Q$ to output the multiplied result to the subtracter 205. The subtracter 205 calculates the difference between the outputs of the two multipliers 203 and 204. As a result, the output of the subtracter 205 will be the phase error between the decision signal constellation and the demodulated signal constellation.

The phase error obtained by the subtracter 205 is inputted to the phase extraction section 206, and the phase extraction section 206 extracts only the polarity from the phase error. The extracted polarity of the phase error Phase_Polarity is outputted to the frequency acquisition loop filter 104-1 of the PLL section 104 for frequency acquisition and the phase tracking loop filter 105-1 of the PLL section 105. The output of the phase/frequency detector 101 is one among {+1, 0, −1}.

At this time, the selection of the operation mode of the phase/frequency detector 101 is performed by the control signal LD[1] generated from the lock detection section 14.

That is, the first mode is for acquiring the frequency offset Δω of the carrier before an eye pattern of the demodulated signal constellations CR_I and CR_Q opens due to the frequency offset Δω of the carrier, and is called the blind mode. In the blind mode, if the frequency offset Δω is acquired, the eye pattern of the demodulated signal constellations starts to open.

The second mode is for tracking the low frequency offset Δω and residual phase jitter Δθ of the carrier acquired through the blind mode, and is called the decision-directed mode.

If the characteristic function of the phase/frequency detector 101 is e(ϕ), it satisfies three conditions as shown in the following equations 12 to 14, and the phase/frequency detector 101 of the M-QAM carrier restoration section 100 can stably operate.

$$e(\phi)=e(\phi+(½)*k*\pi) k \epsilon Z \quad \text{[Equation 12]}$$

$$e(\phi)=-e(-\phi) \quad \text{[Equation 13]}$$

$$\text{If } e(\phi)=0, \text{ only } \phi=0 \text{ exists through } [\pi/4, -\pi/4]. \quad \text{[Equation 14]}$$

Here, ϕ is the difference between the phases of the demodulated signal constellation and the decision signal constellation, and Z is an integer set.

Since the first condition of Equation 12 is that four quadrants are not discriminated in case of the QAM, and it corresponds to the phase ambiguity of 90°. This phase ambiguity can be solved by performing the differential encoding in the transmitting end, and performing the differential decoding in the receiving end.

The second condition of Equation 13 means the polarity of the phase difference between the demodulated signal constellation and the decision signal constellation, which means that the phase error has a positive value or negative value according to the late/early state of the frequencies of the demodulated signal constellation and the local oscillator.

The third condition of Equation 14 means that the output of the phase/frequency detector 101 is 0 (i.e., zero) only when the phase of the demodulated signal constellation coincides with the phase of the decision signal constellation.

Accordingly, the characteristic function e($\phi$) of the phase/frequency detector 101 is expressed by the following equations 15 and 16 according to the two operation modes.

The characteristic function e($\phi$) of the phase/frequency detector 101 in the blind mode is $$e(\phi)=\text{sgn}(\theta-\phi)=\text{sgn}(CR\_Q*D_{Blind\_}I-CR\_I*D_{Blind\_}Q) \quad \text{[Equation 15]}$$

The characteristic function e($\phi$) of the phase/frequency detector 101 in the decision-directed mode is $$e(\phi)=\text{sgn}(\theta-\phi)=\text{sgn}(CR\_Q*D_{DD\_}I-CR\_I*D_{DD\_}Q) \quad \text{[Equation 16]}$$

Here, the sgn(#) operand serves as an extractor for extracting the polarity #. Also, (CR_I, CR_Q) represent the inphase and the quadrature of the demodulated signal constellation, and $\theta$ represents the phase of the demodulated signal constellation. Also, $D_{Blind\_}I$ and $D_{Blind\_}Q$ represent the inphase and the quadrature of the blind decision element 102 in the blind mode, and $\phi$ represents the phase of the blind decision signal constellation. Especially, the phase $\phi$ of the decision signal constellation of the blind decision element 102 has the following values, and an example of the decision signal constellation of 4/16/64/256 QAM is illustrated in FIG. 8.

First quadrant: $\phi=45°$
Second quadrant: $\phi=135°$
Third quadrant: $\phi=225°$
Fourth quadrant: $\phi=315°$ Also, $\alpha$ values of the respective quadrants are given in the following table 1.

[Table 1]

| Modulation | First Quadrant | Second Quadrant | Third Quadrant | Fourth Quadrant |
|---|---|---|---|---|
| 256-QAM | 10.63 | −10.63 | −10.63 | 10.63 |
| 64-QAM | 10.5 | −10.5 | −10.5 | 10.5 |
| 16-QAM | 10.0 | −10.0 | −10.0 | 10.0 |
| 4-QAM | 8.0 | −8.0 | −8.0 | 8.0 |

An equation for calculating $\alpha$ values $$\alpha=(\Sigma x^2) \div (\Sigma \text{abs}(x))$$

where, x denotes the demodulated signal constellation.

Meanwhile, $D_{DD\_}I$ and $D_{DD\_}Q$ represent the inphase and the quadrature of the decision-directed decision element 103 in the decision-directed mode, and $\phi$ represents the decision signal constallation in the decision-directed mode. FIG. 10 shows an example of the decision signal constellation of 16 QAM.

Figure 17A:
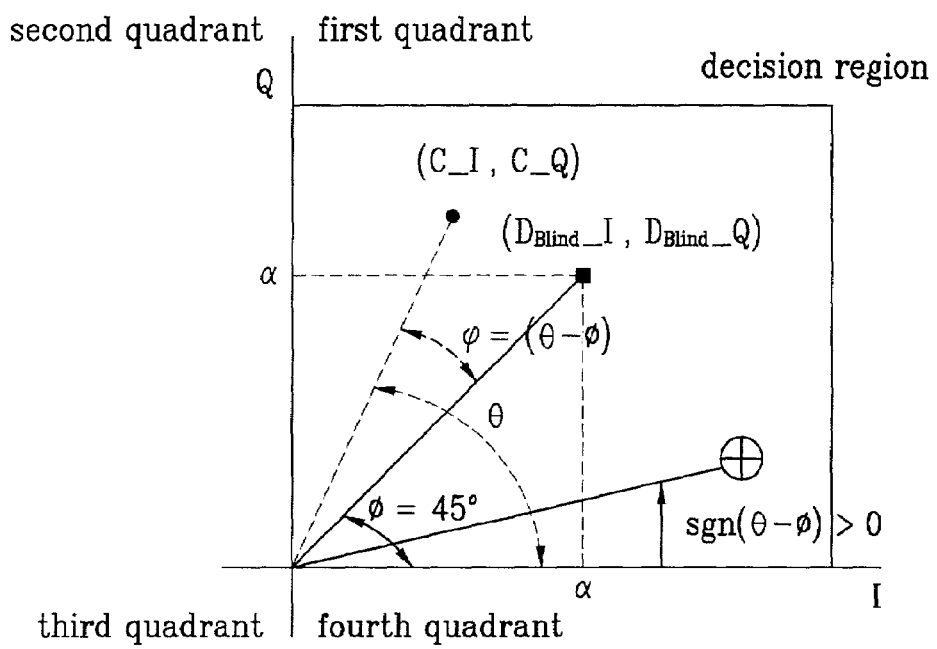
Figure 17B:
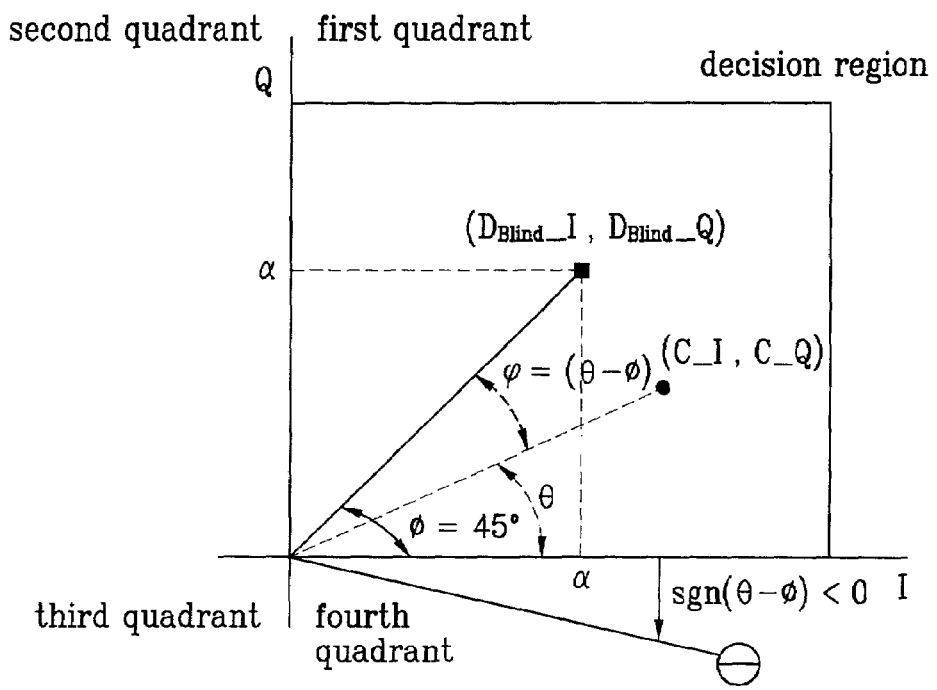

FIGS. 17A and 17B are views illustrating the geometrical characteristic of the characteristic function e($\phi$) of a phase/frequency detector 101 in the blind mode. Specifically, FIG. 17A shows the case that the phase $\theta$ of the demodulated signal constellations CR_I and CR_Q is larger than the phase $\phi$ of the decision signal constellations $D_{Blind\_}I$ and $D_{Blind\_}Q$, and the result of the characteristic function e($\phi$) of the phase/frequency detector 101 has a positive value (i.e., sgn($\theta$−$\phi$)>0). FIG. 17B shows the case that the phase $\theta$ of the demodulated signal constellations CR_I and CR_Q is smaller than the phase $\phi$ of the decision signal constellations $D_{Blind\_}I$ and $D_{Blind\_}Q$, and the result of the characteristic function e($\phi$) of the phase/frequency detector 101 has a negative value (i.e., sgn($\theta$−$\phi$)<0).

Figure 18A:
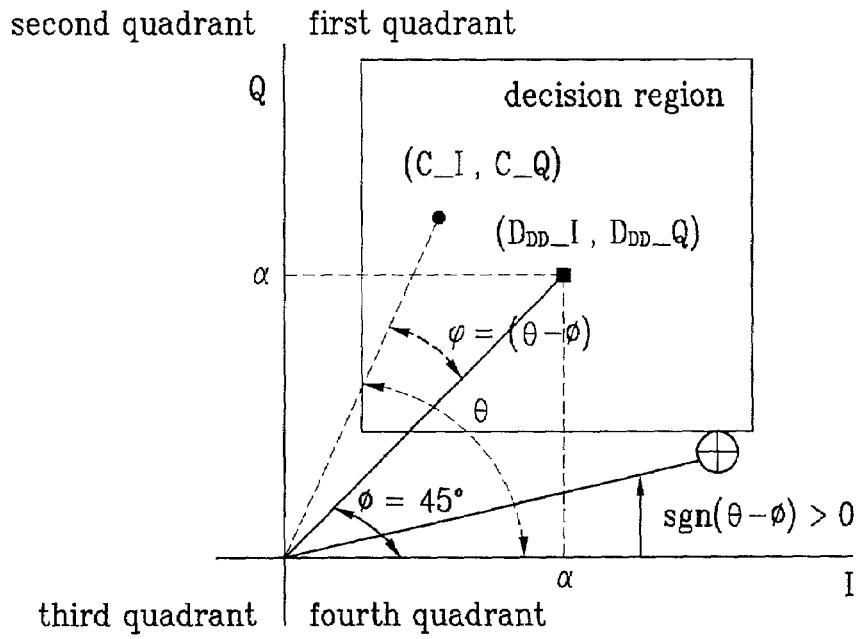
Figure 18B:
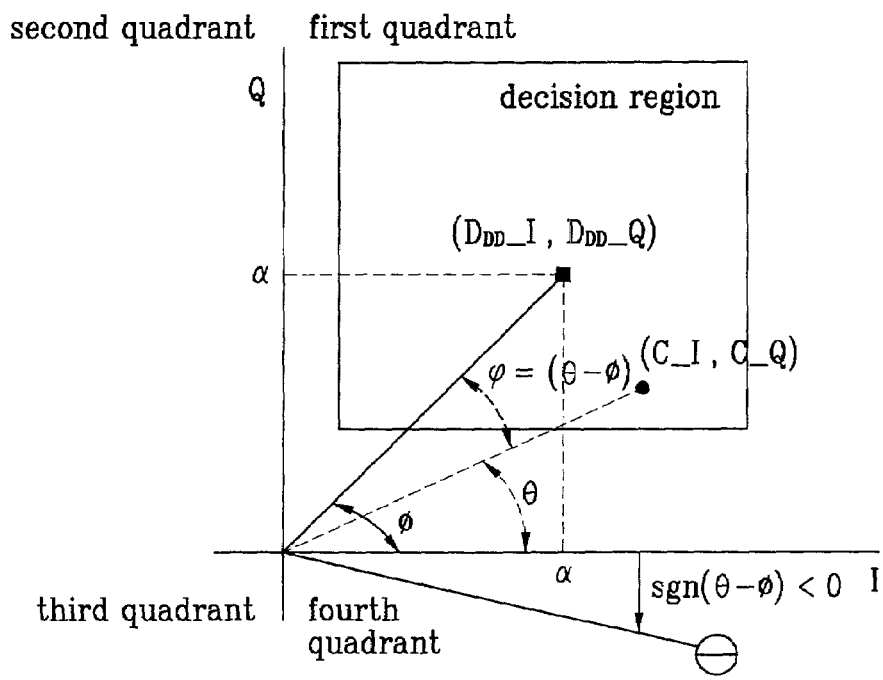

FIGS. 18A and 18B are views illustrating the geometrical characteristic of the characteristic function e($\phi$) of a phase/frequency detector 101 in the decision-directed mode. Specifically, FIG. 18A shows the case that the phase $\theta$ of the demodulated signal constellations CR_I and CR_Q is larger than the phase $\phi$ of the decision-directed decision signal constellations $D_{DD\_}I$ and $D_{DD\_}Q$, and the result of the characteristic function e($\phi$) of the phase/frequency detector 101 has a positive value (i.e., sgn($\theta$−$\phi$)>0). FIG. 18B shows the case that the phase $\theta$ of the demodulated signal constellations CR_I and CR_Q is smaller than the phase $\phi$ of the decision-directed decision signal constellations $D_{DD\_}I$ and $D_{DD\_}Q$, and the result of the characteristic function e($\phi$) of the phase/frequency detector 101 has a negative value (i.e., sgn($\theta$−$\phi$)<0).

Referring to the construction of the blind decision element 102 as illustrated in FIG. 7, the polarity extraction sections 301a and 301b extract the polarities of the demodulated signal constellations CR_I and CR_Q generated from the phase tracking section 105-3, respectively, and provide the polarities to the third and fourth multiplexers 303a and 303b as selection signals. At this time, to the third and fourth multiplexers 303a and 303b are inputted pre-calculated $\alpha$ values of the respective quadrants and inverted $\bar{\alpha}$ values 302a and 302b, and one of the $\alpha$ value and the $\bar{\alpha}$ value is selected and outputted according to the extracted polarity. That is, the outputs of the third and fourth multiplexers 303a and 303b become the 2-level blind decision signal constellations $D_{Blind\_}I$ and $D_{Blind\_}Q$.

FIG. 8 shows (I, Q) coordinates of the blind decision signal constellations of 4/16/64/256 QAM. The blind decision signal constellations generated from the third and fourth multiplexers 303a and 303b are used as the decision signal constellations when the operation mode of the phase/frequency detector 101 is the blind mode.

Referring to the construction of the decision-directed decision element 103 the multi-level comparators 401a and 401b compare the signal levels of the demodulated signal constellations CR_I and CR_Q generated from the phase tracking element 105-3, and provide the result of comparison to the fifth and sixth multiplexers 403a and 403b, respectively. At this time, the n predetermined decision signal level values 402a and 402b are inputted to the fifth and sixth multiplexers 403a and 403b, and the fifth and sixth multiplexers 403a and 403b select and output to the phase/frequency detector 101 one among the n decision signal levels according to the output results of the comparators 401a and 401b as the decision-directed decision signal constellations $D_{DD\_}I$ and $D_{DD\_}Q$. That is, the decision-directed decision signal constellations $D_{DD\_}I$ and $D_{DD\_}Q$ outputted from the fifth and sixth multiplexers 403a and 403b are used as the decision signal constellations when the operation mode of the phase/frequency detector 101 is the decision-directed mode.

FIG. 10 shows (I, Q) coordinates of the 4-level decision-directed decision signal constellations of 16 QAM. For example, if the demodulated signal constellations CR_I and CR_Q are within the decision region of the first quadrant, it is judged that they are the signals in the first quadrant, and the decision-directed decision signal constellation are generated accordingly.

FIG. 11 is a block diagram illustrating the detailed construction of the frequency acquisition loop filter 104-2. The bandwidth values 501a, 501b, 502a and 502b are previously calculated based on the following Table 2, and are inputted to the seventh eighth, tenth and eleventh multiplexers 503a, 503b, 504a, and 504b. Specifically, the first positive bandwidth values Frequency1Bw_# are inputted to the seventh multiplexer 503a, while the first negative bandwidth values (Frequency1Bw_#)-bar are inputted to the eighth multiplexer 504a, based on the table 2. The second positive bandwidth values Frequency2Bw_# are inputted to the tenth multiplexer 503b, while the second negative bandwidth values (Rrequency2Bw_#)-bar are inputted to the eleventh multiplexer 504b, based on the table 2.

TABLE 2

| Word Length | Dynamic Range | Bandwidth of Loop Filter | Floating Point | Fixed Point |
|---|---|---|---|---|
| 30Bits | (0~2 π) | 2 π | 6.283185307 | 1073741823 |
| | | Center Frequency(π/2) | 1.570796326 | 268435456 |
| | | Frequency1Bw_0 | 0.003972973 | 678912 |
| | | Frequency1Bw_1 | 0.000529729 | 90496 |
| | | Frequency1Bw_2 | 0.000264865 | 45184 |
| | | Frequency1Bw_3 | 0.000026486 | 4608 |
| | | Frequency2Bw_0 | 0.000080533 | 13824 |
| | | Frequency2Bw_1 | 0.000014321 | 256 |
| | | Frequency2Bw_2 | 0.000003581 | 128 |
| | | Frequency2Bw_3 | 0.000000006 | 1 |

Then, the seventh and eighth multiplexers 503a and 504a select one among a plurality of the first positive bandwidth values and one among a plurality of the first negative bandwidth values, respectively, to output the selected values to the ninth multiplexer 505a according to the control signal LD[2:0] of the lock detection section 14. The ninth multiplexer 505a selects the first positive bandwidth values or the first negative bandwidth values outputted from the seventh and eighth multiplexers 503a and 504a to output the selected values to the adder 508 according to the polarity of the phase error detected by the phase/frequency detector 101.

Also, the tenth and eleventh multiplexers 503b and 504b select one among a plurality of the second positive bandwidth values and one among a plurality of the second negative bandwidth values, respectively, to output the selected values to the twelfth multiplexer 505b according to the control signal LD[2:0] of the lock detection section 14. The twelfth multiplexer 505b selects the second positive bandwidth values or the second negative bandwidth values outputted from the tenth and eleventh multiplexers 503b and 504b to output the selected values to the adder 506 according to the polarity of the phase error detected by the phase/frequency detector 101.

The adder 506 adds the output of the twelfth multiplexer 505b and the signal delayed by one symbol to output the result of addition to the delay 507, and the delay 507 delays the output of the adder 506 by one symbol to output the delayed output to the adders 506 and 508. The adder 508 adds the output of the ninth multiplexer 505a and the output of the delay 507 to output the result of addition to the adder 509. The output of the adder 508 is the frequency offset Δω.

The adder 509 adds the frequency offset Δω outputted from the adder 508 and the intermediate frequency $\omega_c$ of the carrier externally inputted to output the result of addition to the numerically controlled oscillator 104-2.

That is the adders 506 and 508, and the delay 507 comprise a kind of integrator, and generate the frequency offset Δω by accumulating the output results of the ninth and twelfth multiplexers 505a and 505b in the unit of a symbol.

FIG. 12 is a block diagram illustrating the detailed construction of the numerically controlled oscillator (NCO) 104-2. The NCO 104-2 is a typical numerically controlled oscillator for generating the digital type sine wave $\sin(\omega_c+\Delta\omega)$ and the cosine wave $\cos(\omega_c+\Delta\omega)$ according to the intermediate frequency $\omega_c$ and the frequency offset Δω of the carrier wave generated from the frequency acquisition loop filter 104-1. In FIG. 12, the adder 602, the 2π module 603, and the delay 604 comprise a simple integrator, and use the phase characteristic value of the modulo 2π to prevent the overflow as known in the art. The sine wave $\sin(\omega_c+\Delta\omega)$ and the cosine wave $\cos(\omega_c+\Delta\omega)$ corresponding to the signal outputted from the integrator are selected from the cosine lookup table 605 storing a plurality of cosine waves and the sine lookup table 606 storing a plurality of sine waves, and are outputted to the frequency acquisition element 104-3.

FIG. 13 is a block diagram illustrating the detailed construction of the frequency acquisition element. The multiplier 701 multiplies the cosine wave $\cos(\omega_c+\Delta\omega)$ outputted from the NCO 104-2 and the I pass-band digital signal PB_I outputted from the preprocessing section 11 to shift the I pass-band digital signal PB_I to the I base-band digital signal BB_I. The multiplier 702 multiplies the sine wave $\sin(\omega_c+\Delta\omega)$ outputted from the NCO 104-2 and a Q pass-band digital signal PB_Q outputted from the preprocessing section 11 to shift the Q pass-band digital signal PB_Q to the Q base-band digital signal BB_Q.

Specifically, the frequency acquisition element 104-3 demodulates the pass-band digital signal PB_Data having the frequency offset Δω generated from the preprocessing section 11 by the cosine wave $\cos(\omega_c+\Delta\omega)$ and the sine wave $\sin(\omega_c+\Delta\omega)$ generated from the NCO 104-2 and outputs the base-band digital signals BB_I and BB_Q with the frequency offset Δω acquired, i.e., compensated for.

FIG. 14 is a block diagram illustrating the detailed construction of the phase tracking loop filter 105-1, in which bandwidth values 801a and 801b of the phase tracking loop filter are pre-calculated based on the following table 3, and are inputted to the thirteenth and fourteenth multiplexers 802a and 802b. Specifically, the positive bandwidth values PhaseBw_# is inputted to the thirteenth multiplexer 802a, while the negative bandwidth values (PhaseBw_#)-bar is inputted to the fourteenth multiplexer 802b, based on the table 3.

TABLE 3

| Word Length | Dynamic Range | Bandwidth of Loop Filter | Floating Point | Fixed Point |
|---|---|---|---|---|
| 20Bits | (−π/4~π/4) | π/4 | 0.785398164 | 524288 |
| | | PhaseBw_0 | 0.057268079 | 38228 |
| | | PhaseBw_1 | 0.000572681 | 382 |
| | | PhaseBw_2 | 0.000143175 | 95 |
| | | PhaseBw_3 | 0.000001432 | 1 |

The thirteenth and fourteenth multiplexers 802a and 802b select one among a plurality of the positive bandwidth values and one among a plurality of the negative bandwidth values, respectively, to output the selected values to the fifteenth multiplexer 803 according to the control signal LD[2:0] of the lock detection section 14. The fifteenth multiplexer 803 selects the positive or negative bandwidth values outputted from the thirteenth and fourteenth multiplexers 802a and 802b to output the selected value to the adder 804 according to the polarity of the phase error detected by the phase/frequency detector 101.

The output of the adder 804 is successively fed back to the adder 804 through the modulo π/4 805 and the delay 806, and simultaneously is outputted to the phase ROM table 105-2. Specifically, the adder 804 adds the output of the fifteenth multiplexer 803 and the feedback signal to output the result of addition to the modulo π/4 805. Here, the adder 804, the π/4 module 805, and the delay 806 comprise a simple integrator.

Specifically, the integrator generates the residual phase jitter Δθ of the carrier wave by accumulating the output result of the fifteenth multiplexer 803 in a unit of symbol. The generated residual phase jitter Δθ of the carrier is inputted to the phase ROM table 105-2.

FIG. 15 is a block diagram of the detailed construction of the phase ROM table. The phase ROM table 105-2 generates the sine wave $sin(\omega_c+\Delta\omega)$ and the cosine wave $cos(\omega_c+\Delta\omega)$ in the range of −π/4~π/4 according to the residual phase jitter Δθ of the carrier generated from the frequency acquisition loop filter 105-1 to output the sine and cosine waves to the phase tracking element 105-3.

The MSB extraction section 905 extracts the most significant bit (MSB), i.e., sign bit of the residual phase jitter Δθ of the inputted carrier, and provides the sign bit as a selection signal of the sixteenth and seventeenth multiplexers 904 and 905. The lower bit extraction section 902 extracts the remaining bits from the residual phase jitter Δθ of the carrier except for the MSB of the phase jitter Δθ. The output of the lower bit extraction section 902 is bypassed to the sixteenth multiplexer 904, and simultaneously the 2's complement section 903 obtains a complement on 2 with respect to an output of the lower bit extraction section 902 to output the 2's complement to the sixteenth multiplexer 904. The sixteenth multiplexer 904 selects one of the output of the lower bit extraction section 902 and the output of the 2's complement section 903 to output the selected output to the lookup table 905 according to the output of the MSB extraction section 901. The lookup table 905 selects and outputs the sine and cosine waves corresponding to the output of the sixteenth multiplexer 904. That is, the cosine wave $cos(\Delta\theta)$ is directly inputted to the phase tracker 105-3, and the sine wave $sin(\Delta\theta)$ is inputted to the phase tracking element 105-3 via the seventeenth multiplexer 707.

The seventeenth multiplexer 907 selects one of the sine wave $sin(\Delta\theta)$ bypassed from the lookup table 906 and the sine wave obtaining the 2's complement from the 2's complement section 903 to output the selected sine wave to the phase tracking element according to the MSB outputted from the MSB extraction section 901.

FIG. 16 is a block diagram illustrating the detailed construction of a phase tracking element 105-3. The phase tracking element 105-3 demodulates the bass-band digital signal having the frequency offset Δω acquired by the frequency acquisition element 104-3 by the sine wave $sin(\Delta\theta)$ and the cosine wave $cos(\Delta\theta)$ in the range of −π/4~π/4 produced from the phase ROM table 105-2, and generates the base-band digital signals CR_I and CR_Q with the residual phase jitter Δθ tracked by the phase tracking element 105-3. The base-band digital signals CR_I and CR_Q with the residual phase jitter Δθ tracked by the phase tracking element 105-3 are outputted to the post-proceeding section 13, and simultaneously are outputted to the blind decision element 102, the decision-directed decision element 103 and the phase/frequency detector 101.

As described above, the carrier restoration apparatus according to the present invention can be applied to all of QAM/PSK digital receivers.

For example, the carrier restoration apparatus can be applied to a single QAM cable digital receiver, a single QPSK satellite digital receiver, a single 8PSK satellite digital receiver, a composite QAM/QPSK cable/satellite digital receiver, a composite QAM/8PSK cable/satellite digital receiver or the like.

With the construction of the carrier restoration apparatus according to the present invention, the frequency acquisition PLL section for acquiring the frequency offset and the phase tracking PLL section for tracking the residual phase jitter are separately constructed, and the apparatus operates in two modes for first acquiring the frequency offset and then tracking the residual phase jitter, so that the rapid acquisition/tracking can be performed so as to minimize the frequency offset and phase jitter of several hundred KHz produced from the tuner or the RF oscillator, and the high-reliability acquisition/tracking can be performed even under the low SNR and serious channel ISI (i.e., ghost).

Further, since the phase/frequency detector for detecting the phase error is commonly used for the frequency acquisition PLL section and the phase tracking PLL section, and the phase error is expressed by the polarity, the circuit complexity can be reduced, and especially the circuit construction of the frequency acquisition PLL section and the phase tracking PLL section can be simplified.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A carrier restoration apparatus for converting a pass-band digital signal of a specified channel into a base-band digital signal where a frequency offset and a phase jitter are compensated by demodulating the pass-band digital signal by a sine/cosine wave, the apparatus comprising:

a phase/frequency detection section for obtaining a phase error between constellations of a demodulated signal and constellations of a blind decision signal or a decision-directed decision signal, and extracting a polarity of the phase error;

a loop section for frequency acquisition for extracting the corresponding frequency offset by accumulating pre-calculated bandwidth values according to the polarity of the phase error, generating the digital type sine and cosine waves according to the extracted frequency offset, and then generating the base-band digital signal where the frequency offset of a carrier is acquired by demodulating the pass-band digital signal by the sine and cosine waves;

a loop section for phase tracking for extracting the corresponding phase jitter by accumulating the pre-calculated bandwidth values according to the polarity of the phase error, generating the digital type sine and cosine waves according to the extracted phase jitter, and then generating demodulated signal constellations where the phase jitter is tracked by demodulating the base-band digital signal by the sine and cosine waves;

a blind decision section for extracting the polarity of the demodulated signal constellations generated from the loop section for phase tracking, and generating blind decision signal constellations by slicing the demodulated signal constellations according to the extracted polarity; and a decision-directed decision section for generating a decision-directed decision signal constellations matching respective signal levels of the demodulated signal constellations generated from the loop section for phase tracking, wherein the loop section for frequency acquisition comprises:

a frequency acquisition loon filter for detecting the corresponding frequency offset $\Delta\omega$ by accumulating values of predetermined positive or negative bandwidths for frequency acquisition according to the polarity of the phase error extracted by the phase/frequency detection section;

a controlled oscillator for generating the digital type sine wave $\sin(\omega_c+\Delta\omega)$ and cosine wave $\cos(\omega_c+\Delta\omega)$ according to the corresponding frequency offset detected by the frequency acquisition loop filter; and a frequency acquisition element for generating the base-band digital signal where the frequency offset is acquired by demodulating the pass-band digital signal PB Data by the cosine wave $\cos(\omega_c+\Delta\omega)$ and the sine wave $\sin(\omega_c+\Delta\omega)$ generated from the controlled oscillator.

2. The apparatus as claimed in claim 1, wherein the phase/frequency detection section operates in a blind mode for extracting the polarity by obtaining the phase error between the demodulated signal constellation and the blind decision signal constellation in order to acquire the frequency offset, or in a decision-directed mode for extracting the polarity by obtaining the phase error between the demodulated signal constellation and the decision-directed decision signal constellation in order to track the phase jitter, and further comprises a lock detection section for controlling selection of the blind mode and the decision-directed mode.

3. The apparatus as claimed in claim 1, wherein a gear shifting of the filter bandwidth of the frequency acquisition loop filter is automatically performed by a lock control signal of a lock detection section.

4. The apparatus as claimed in claim 1, wherein the frequency acquisition loop filter comprises:

a first selection section for selecting one among a plurality of pre-calculated first positive bandwidth values according to a lock control signal of a lock detection section;

a second selection section for selecting one among a plurality of pre-calculated first negative bandwidth values according to the lock control signal;

a third selection section for selecting one of outputs of the first and second selection sections according to the polarity of the phase error detected by the phase/frequency detector;

a fourth selection section for selecting one among a plurality of pre-calculated second positive bandwidth values according to the lock control signal;

a fifth selection section for selecting one among a plurality of pre-calculated second negative bandwidth values according to the lock control signal;

a sixth selection section for selecting one of outputs of the fourth and fifth selection sections according to the polarity of the phase error detected by the phase/frequency detector; and an integrator for detecting the corresponding frequency offset $\Delta\omega$ by accumulating outputs of the third and sixth selection sections in the unit of a symbol.

5. The apparatus as claimed in claim 1, wherein the loop section for phase tracking comprises:

a phase tracking loop filter for generating the corresponding phase jitter $\Delta\theta$ by accumulating values of pre-calculated bandwidths for phase tracking according to the polarity of the phase error extracted by the phase/frequency detection section;

a phase ROM table for generating the digital type sine wave $\sin(\omega_c+\Delta\omega)$ and cosine wave $\cos(\omega_c+\Delta\omega)$ according to the corresponding phase jitter detected by the phase tracking loop filter; and a phase tracking element for generating the demodulated signal constellations where the corresponding phase jitter of the base-band digital signal outputted from the loop section for frequency acquisition is tracked by the cosine wave $\cos(\Delta\theta)$ and the sine wave $\sin(\Delta\theta)$ generated from the phase ROM table.

6. The apparatus as claimed in claim 5, wherein a gear shifting of the filter bandwidth of the phase tracking loop filter is automatically performed by a lock control signal of a lock detection section.

7. The apparatus as claimed in claim 5, wherein the phase tracking loop filter comprises:

a first selection section for selecting one among a plurality of pre-calculated first positive bandwidth values for phase tracking according to a lock control signal of a lock detection section;

a second selection section for selecting one among a plurality of pre-calculated first negative bandwidth values for phase tracking according to the lock control signal;

a third selection section for selecting one of outputs of the first and second selection sections according to the polarity of the phase error detected by the phase/frequency detector; and an integrator for detecting the corresponding phase jitter $\Delta\theta$ by accumulating an output of the third selection sections in the unit of a symbol.

8. The apparatus as claimed in claim 1, wherein the blind decision section comprises:

a polarity extraction section for extracting the polarity of the demodulated signal constellation generated from the phase tracking section in the unit of a symbol; and a selection section for generating blind decision signal constellations by slicing by two levels the demodulated signal constellations according to the polarity extracted by the polarity extraction section;

wherein pre-calculated $\alpha$ values and inverted $\overline{\alpha}$ values of respective quadrants are inputted to the selection section, and the polarity from the polarity extraction section is used as a selection signal.

9. The apparatus as claimed in claim 1, wherein the decision-directed decision section comprises:

a multi-level comparator for comparing levels of the demodulated signal constellations generated from the phase tracking element; and a selection section for receiving a plurality of level signals, selecting one among the plurality of level signals using an output of the multi-level comparator as a selection signal, and outputting the selected level signal to the phase/frequency detection section as the decision-directed decision signal constellations.

10. A carrier restoration method of converting a pass-band digital signal of a specified channel into a base-band digital signal where a frequency offset and a phase jitter are compensated by demodulating the pass-band digital signal by a sine/cosine wave, the method comprising:

a phase/frequency detection step of obtaining a phase error between constellations of a demodulated signal and constellations of a blind decision signal or a decision-directed decision signal, and extracting a polarity of the phase error;

a frequency acquisition step of extracting the corresponding frequency offset by accumulating pre-calculated bandwidth values according to the polarity of the phase error, generating the digital type sine and cosine waves according to the extracted frequency offset, and then generating the base-band digital signal where the frequency offset of a carrier is acquired by demodulating the pass-band digital signal by the sine and cosine waves;

a phase tracking step of extracting the corresponding phase jitter by accumulating the pre-calculated bandwidth values according to the polarity of the phase error, generating the digital type sine and cosine waves according to the extracted phase jitter, and then generating demodulated signal constellations where the phase jitter is tracked by demodulating the base-band digital signal by the sine and cosine waves;

a blind decision step of extracting the polarity of the demodulated signal constellations generated from the loop section for phase tracking, and generating blind decision signal constellations by slicing the demodulated signal constellations according to the extracted polarity; and a decision-directed decision step of generating a decision-directed decision signal constellations matching respective signal levels of the demodulated signal constellations generated at the phase tracking step, wherein the phase/frequency detection step further comprises a lock detection step for controlling selection of a blind mode and a decision-directed mode, and wherein the lock detection step automatically performs a gear shifting with respect to respective filter bandwidth at the frequency acquisition step and the phase tracking step.

11. The method as claimed in claim 10, wherein the phase/frequency detection step extracts the polarity by obtaining the phase error between the demodulated signal constellation and the blind decision signal constellation in a blind mode for acquiring the frequency offset.

12. The method as claimed in claim 10 wherein the phase/frequency detection step extracts the polarity by obtaining the phase error between the demodulated signal constellation and the decision-directed decision signal constellation in a decision-directed mode for tracking the phase jitter.

13. The method as claimed in claim 10, wherein the frequency acquisition step comprises the steps of:

detecting the corresponding frequency offset $\Delta\omega$ by accumulating values of predetermined positive or negative bandwidths for frequency acquisition according to the polarity of the phase error extracted at the phase/frequency detection step;

generating the digital type sine wave $\sin(\omega_c+\Delta\omega)$ and cosine wave $\cos(\omega_c+\Delta\omega)$ according to the corresponding frequency offset detected at the frequency offset detection step; and generating the base-band digital signal where the frequency offset is acquired by demodulating the pass-band digital signal PB_Data by the cosine wave $\cos(\omega_c+\Delta\omega)$ and the sine wave $\sin(\omega_c+\Delta\omega)$ generated at the sine and cosine wave generating step.

14. The method as claimed in claim 10, wherein the phase tracking step comprises the steps of:

generating the corresponding phase jitter $\Delta\theta$ by accumulating values of pre-calculated bandwidths for phase tracking according to the polarity of the phase error extracted at the phase/frequency detection step;

generating the digital type sine wave $\sin(\omega_c+\Delta\omega)$ and cosine wave $\cos(\omega_c+\Delta\omega)$ according to the corresponding phase jitter detected at the phase jitter generating step; and generating the demodulated signal constellations where the corresponding phase jitter of the base-band digital signal outputted at the frequency acquisition step is tracked by the cosine wave $\cos(\Delta\theta)$ and the sine wave $\sin(\Delta\theta)$ generated at the sine and cosine wave generating step.

15. The method as claimed in claim 10, wherein the blind decision step comprises the steps of:

extracting the polarity of the demodulated signal constellation generated at the phase tracking step in the unit of a symbol; and generating blind decision signal constellations by slicing by two levels the demodulated signal constellations according to the polarity extracted at the polarity extraction step.

16. The method as claimed in claim 10, wherein the decision-directed decision step comprises the steps of:

comparing levels of the demodulated signal constellations generated at the phase tracking step; and selecting one among a plurality of level signals according to a result of comparison, and outputting the selected level signal as the decision-directed decision signal constellations of the phase/frequency step.

* * * * *